US012810690B2

(12) United States Patent
Farina et al.

(10) Patent No.: US 12,810,690 B2
(45) Date of Patent: Nov. 24, 2026

(54) ELECTRONIC GAME SYSTEMS AND METHODS HAVING PERSISTENT AND GROWING REELS AND A TIMING ANIMATION

(71) Applicant: Aristocrat Technologies, Inc., Las Vegas, NV (US)

(72) Inventors: Nicholas Farina, Granger, IN (US); Jennifer Mizzi, Ewa Beach, HI (US); Rogelio Decasa, Jr., Renton, WA (US); Nathan Warms, Austin, TX (US); Zachary Smith, Austin, TX (US); Kelly Lockheed, Elkridge, MD (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 196 days.

(21) Appl. No.: 18/740,997

(22) Filed: Jun. 12, 2024

(65) Prior Publication Data

US 2025/0384740 A1 Dec. 18, 2025

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
None
See application file for complete search history.

(56) References Cited

U.S. PATENT DOCUMENTS

| | | | | |
|---|---|---|---|---|
| 6,251,013 B1 * | 6/2001 | Bennett | G07F 17/3244 463/20 |
| 12,033,474 B2 * | 7/2024 | Visser | G07F 17/34 |
| 2002/0039919 A1 * | 4/2002 | Joshi | G07F 17/3267 463/20 |
| 2015/0228153 A1 * | 8/2015 | Hedrick | G06Q 20/3223 463/31 |
| 2018/0204414 A1 * | 7/2018 | Narducci | G07F 17/3244 |
| 2021/0217272 A1 * | 7/2021 | Sanborn | G07F 17/34 |
| 2023/0177911 A1 * | 6/2023 | Milosevich | G07F 17/3213 463/31 |
| 2024/0378942 A1 * | 11/2024 | Hillstrom | G07F 17/3267 |
| 2025/0087055 A1 * | 3/2025 | DeBrabander | G07F 17/3211 |

* cited by examiner

*Primary Examiner* — Omkar A Deodhar
(74) *Attorney, Agent, or Firm* — Armstrong Teasdale LLP

(57) ABSTRACT

An electronic gaming device including a memory device storing instructions and a processor is disclosed. The processor is configured to: (i) cause a base game to transition to a feature game when a trigger condition is met; (ii) randomly determine a set of multiplier values for each row of a game matrix including a multiplier value corresponding to each row of the game matrix during the feature game; (iii) cause the set of multiplier values to be displayed next to the game matrix, wherein each multiplier value of the set of multiplier values is displayed next to the row corresponding to the multiplier value; and (iv) determine an award amount based at least in part on the symbols displayed in the game matrix during the feature game and the set of multiplier values.

20 Claims, 28 Drawing Sheets

ELECTRONIC GAME SYSTEMS AND METHODS HAVING PERSISTENT AND GROWING REELS AND A TIMING ANIMATION

TECHNICAL FIELD

The field of disclosure relates generally to electronic gaming systems and methods, and more specifically, to network-based electronic gaming systems and methods having persistent and growing reels with a timing animation indicating a day mode and a night mode for game play along with randomly selected row multipliers.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency, or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming device including a memory device for storing instructions, and a game controller including at least one processor configured to execute the instructions stored in the memory device is disclosed. The instructions, when executed by the at least one processor, cause the game controller to: (i) cause a base game to be displayed on a display device including a game matrix, the game matrix including a plurality of symbol positions forming multiple rows and columns within the game matrix, each symbol position for displaying a symbol therein; (ii) determine that a trigger condition is met for triggering a feature game based upon a number and type of trigger symbols displayed within the game matrix of the base game; (iii) cause the base game to transition to the feature game; (iv) randomly determine a set of multiplier values for each row of the game matrix including a multiplier value corresponding to each row of the multiple rows of the game matrix during the feature game; (v) cause the set of multiplier values to be displayed next to the game matrix, wherein each multiplier value of the set of multiplier values is displayed next to the row corresponding to the multiplier value; and (vi) determine an award amount based at least in part on the symbols displayed in the game matrix during the feature game and the set of multiplier values.

In another aspect, a computer-implemented method performed by an electronic gaming device including a memory device for storing instructions, and at least one processor configured to execute the instructions stored in the memory device is disclosed. The method includes (i) causing a base game to be displayed on a display device including a game matrix, the game matrix including a plurality of symbol positions forming multiple rows and columns within the game matrix, each symbol position for displaying a symbol therein; (ii) determining that a trigger condition is met for triggering a feature game based upon a number and type of trigger symbols displayed within the game matrix of the base game; (iii) causing the base game to transition to the feature game; (iv) randomly determining a set of multiplier values for each row of the game matrix including a multiplier value corresponding to each row of the multiple rows of the game matrix during the feature game; (v) causing the set of multiplier values to be displayed next to the game matrix, wherein each multiplier value of the set of multiplier values is displayed next to the row corresponding to the multiplier value; and (vi) determining an award amount based at least in part on the symbols displayed in the game matrix during the feature game and the set of multiplier values.

In yet another aspect, at least one non-transitory computer-readable media (CRM) storing instructions thereon is disclosed. The instructions, when executed by at least one processor of an electronic gaming device, cause the at least one processor to: (i) cause a base game to be displayed on a display device including a game matrix, the game matrix including a plurality of symbol positions forming multiple rows and columns within the game matrix, each symbol position for displaying a symbol therein; (ii) determine that a trigger condition is met for triggering a feature game based upon a number and type of trigger symbols displayed within the game matrix of the base game; (iii) cause the base game to transition to the feature game; (iv) randomly determine a set of multiplier values for each row of the game matrix including a multiplier value corresponding to each row of the multiple rows of the game matrix during the feature game; (v) cause the set of multiplier values to be displayed next to the game matrix, wherein each multiplier value of the set of multiplier values is displayed next to the row corresponding to the multiplier value; and (vi) determine an award amount based at least in part on the symbols displayed in the game matrix during the feature game and the set of multiplier values.

DETAILED DESCRIPTION

Figure 1:
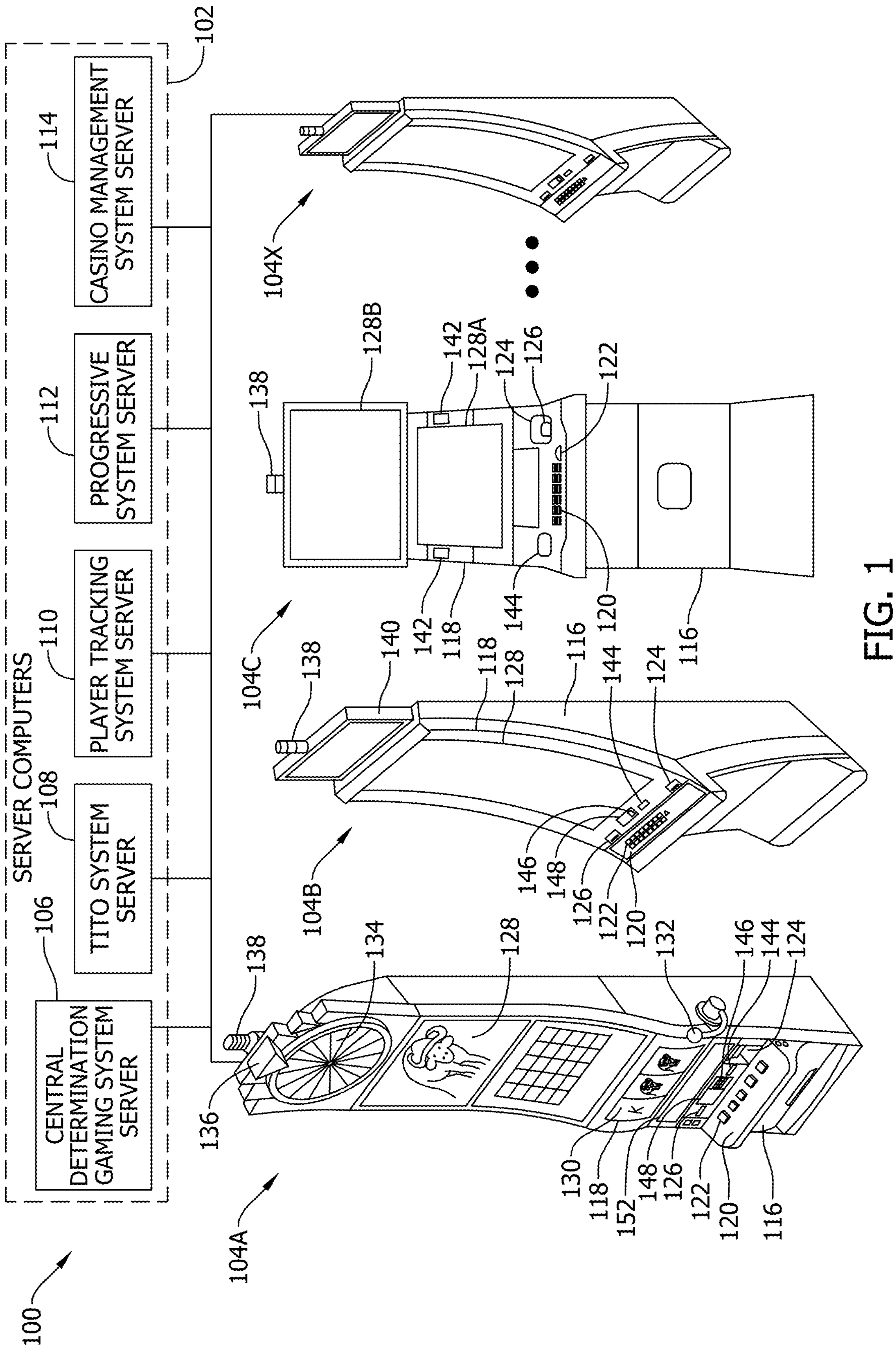
FIG. 1 is an exemplary diagram showing several EGMs networked with various gaming related servers.

The systems and methods described herein include network-based electronic game systems and methods having persistent and growing reels with a timing animation indicating a day mode and a night mode for game play. In the game described herein a bonus game may be triggered when a certain number of predesignated symbols (trigger symbols) land on the reels for display during a base game play. During the base game, a reel set is randomly determined using a random number generator (RNG) from a plurality of reel sets. A reel that includes the randomly selected symbols corresponding to the randomly selected game set are then displayed as the one or more reels spinning during the base game. In response to the particular number of trigger symbols being displayed on the reel matrix when the reels stop spinning, a bonus game feature is triggered.

By way of a non-limiting example, if the particular number of trigger symbols include at least 6 cash-on-reel (COR) symbols, a hold and spin (HNS) bonus feature is triggered. Alternatively, or additionally, if the particular number of trigger symbols includes at least 3 bonus symbols, a free spin bonus game feature is triggered. Further, in some embodiments, when a collect symbol lands on the reel matrix, a timing animation is displayed. For example, an animation may show a sun moving across a horizon based upon the number of collect symbols that land on the reel matrix during each spin. For example, if 3 collect symbols land on the reel matrix, a visual animation showing the sun moving across the horizon by some predesignated distance that is associated with the 3 collect symbols (e.g., 3 percent if 100 collect symbols are needed) from the sun's current position towards a position nearer to a night frenzy mode is triggered and is displayed. In other words, if 100 collect symbols are needed to trigger the night frenzy mode, then if 3 collect symbols are collected, the sun will move about 3 percent of the total path to the night frenzy mode.

Alternatively, in the current embodiment, the night frenzy mode may be triggered upon a random night feature being triggered, in which 100 collect symbols are not needed to trigger the night frenzy mode. The base game matrix may be a 3×5 matrix, which may have 5 reels showing 3 symbols per reel. Alternatively, the base game matrix may have a different number of reels, and each reel may have 3 symbols or more or less than 3 symbols.

In some embodiments, when 6 (or some other predesignated number of) COR symbols land and are displayed on the reel matrix during an electronic base game play, the HNS bonus feature is triggered. During the HNS bonus feature, a player may receive three free spins of the reels. During the HNS bonus game, the 6 COR symbols that triggered the bonus game are persistent and remain on the reels during the bonus game. In other words, just the reel positions that do not already include a COR symbol will spin during the HNS bonus game. Thus, during the HNS bonus game, symbol positions where no COR symbol is displayed from the base game will spin and will be updated. And if a new COR symbol lands on any of those positions during the HNS bonus game, those new COR symbols become persistent for the remainder of the HNS bonus game and the player receives additional free spins. In addition, the credit value corresponding to each COR symbol displayed during the base game and during the HNS bonus feature are selected based on a game tier that is randomly selected using an RNG output. Additionally, for each row of the reel matrix, a multiplier value may be selected and displayed on the display device during the HNS bonus feature. When all symbol positions in a particular row are filled with COR symbols during the HNS bonus feature, the player may be awarded based upon the COR symbol values displayed in the symbol positions for the particular row and the multiplier value corresponding to the particular row. Other COR symbols displayed in other rows (other than the row filled with COR symbols) may be awarded without the multiplier being applied to those CORs.

Additionally, in another embodiment, during the HNS bonus feature, a new row may be triggered and added to the reel matrix. The new row may have symbol positions, which are similar to the number of reels of the reel matrix. The new row may also be randomly assigned a multiplier value from an RNG output and a lookup within a weighted table stored in the memory. In other words, the reel matrix may start out as having 3 rows and then increase to 4 or 5 or "n" rows wherein each row may be randomly assigned a multiplier that gets displayed and applied to all COR values displayed in that particular row when the row is filled with the COR value symbols. At the end of HNS bonus feature, the player may be returned to the electronic base game play.

In some embodiments, when 3 bonus symbols land or are displayed on the reel matrix during play of an electronic base game, the free spin bonus game feature is triggered. During the free spin bonus game feature, a player may get a certain number of free games based upon the total number of bonus symbols landed on the reel matrix during the electronic base game play. For example, the player may be awarded 6, 9, or 15 free spin bonus games when 3, 4, or 5 bonus symbols, respectively, are displayed on the reel matrix during the electronic base game play. During the free spin bonus game, wild symbols in symbol positions of at least one reel may be included and displayed during spins. Additionally, an animation showing a bird (e.g., Phoenix) flying across the display device and over a reel to inform the player that something is happening in that spot on the display device, essentially prompting the player to look at that spot on the screen. The Phoenix flying across the display device may go down over a reel of the reel matrix, and all symbol positions in that reel of the reel matrix may then display wild symbols. By way of a non-limiting example, a speed of the Phoenix, or a frequency of the Phoenix, at which the Phoenix appears on the display device, may vary based upon the credits or wager inputted by the player. The total award value of the player may depend upon a total number of wild symbols that landed during the free spin bonus game. At the end of free spin bonus game, the player may be returned to the electronic base game play.

In some embodiments, during the night frenzy mode feature, the free spin bonus game and/or the HNS bonus feature may be triggered upon the particular number of trigger symbols being displayed on the reel matrix. When the Phoenix symbol lands in a symbol position on the reel matrix, an additional row may be added to the reel matrix for each remaining game instance of the night frenzy mode feature. Thus, the height of the reels or the number of rows may grow as the game is played. By way of a non-limiting example, the reel matrix with the added additional rows may include up to n rows, where n may be 6. Alternatively, a value of n may be more than 6 or less than 6. As described above, in certain embodiments, each row of the reel matrix may have a randomly selected multiplier value assigned and displayed next to the row, which may be applied to the COR values displayed in that row when all symbol positions in that row are filled with a COR symbol. Additionally, or alternatively, in addition to the COR symbols, a Mini Jackpot symbol, a Major Jackpot symbol, a Minor Jackpot symbol, and/or a Grand Jackpot symbol may also be displayed. And in those cases where a multiplier value is assigned to a row, the multiplier value will be applied the jackpot symbols and any COR symbols displayed in that row if the entire row is filled with either COR value symbols or jackpot symbols.

In some embodiments, and by way of a non-limiting example, a random number generator (RNG) and one or more weighted tables may be used by the at least one processor of the gaming system to (i) determine a multiplier value corresponding to each row of the reel matrix during the night frenzy mode, the HNS bonus feature, and/or the free spin bonus game, and/or (ii) display symbols on each reel of the reel matrix during the night frenzy, the HNS bonus feature, and/or the free spin bonus game.

The embodiments of the present disclosure represent a technical improvement in the art of electronic gaming devices, machines, systems, and operations of such electronic gaming devices or systems. Technical improvements represented by the present disclosure include at least (i) using an RNG to randomly provide a wide range of multiplier values for each of the rows of the reel matrix during feature or bonus games, and thus, providing greater variability to the game play while still using similar or less computational resources; (ii) providing a unique timing animation of a sun moving across a horizon when certain collect symbols are presented to the player during game play which indicates to the player, while using only a limited amount of screen space, that the game is moving from a day mode to a night frenzy mode; (iii) using the RNG to randomly trigger the night frenzy mode in some embodiments to provide greater variability in the game; (iv) persistently storing COR symbols on the game matrix when transitioning from the base game to the HNS game; and (v) randomly growing the reels to increase variability within game play.

The embodiments of the present disclosure decouple the base game from the HNS bonus feature, the night frenzy mode, and/or the free spin bonus game to allow for potential expansion of the reel matrix between the base game and any free or HNS features during a bonus game. By configuring the system and method this way, the system is able to better balance game volatility and RTP. Further, embodiments of the present disclosure also improve on reducing the amount of data required for storage while still maintaining game variability and reducing the overall need for large amounts of computational resources based on the randomly selected set of reels and corresponding multiplier values during the bonus game, free game, HNS bonus feature, the free spin bonus game, and/or the night frenzy.

The technical problems addressed herein include at least the inability of known system to decouple base games from HNS bonus features, night frenzy modes, and/or free spin bonus games to allow for potential expansion of the reel matrix between the base game and any free or HNS features during a bonus game. By so doing, the present system provides a better balance of game volatility and RTP. Also, the present system addresses the problems of certain known systems that require substantial amounts of data storage and large amount of computational resources for similar games.

The resulting technical effects and/or technical benefits achieved by this disclosure include at least the ability to decouple the base game from the HNS bonus feature, the night frenzy, and/or the free spin bonus game to allow for potential expansion of the reel matrix between the base game and any free game or HNS features during a bonus game, and/or the ability to improve an amount of data storage and use of computational resources based on a randomly selected set of reels and corresponding multiplier values during the bonus game, free game, HNS bonus feature, the free spin bonus game, and/or the night frenzy.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
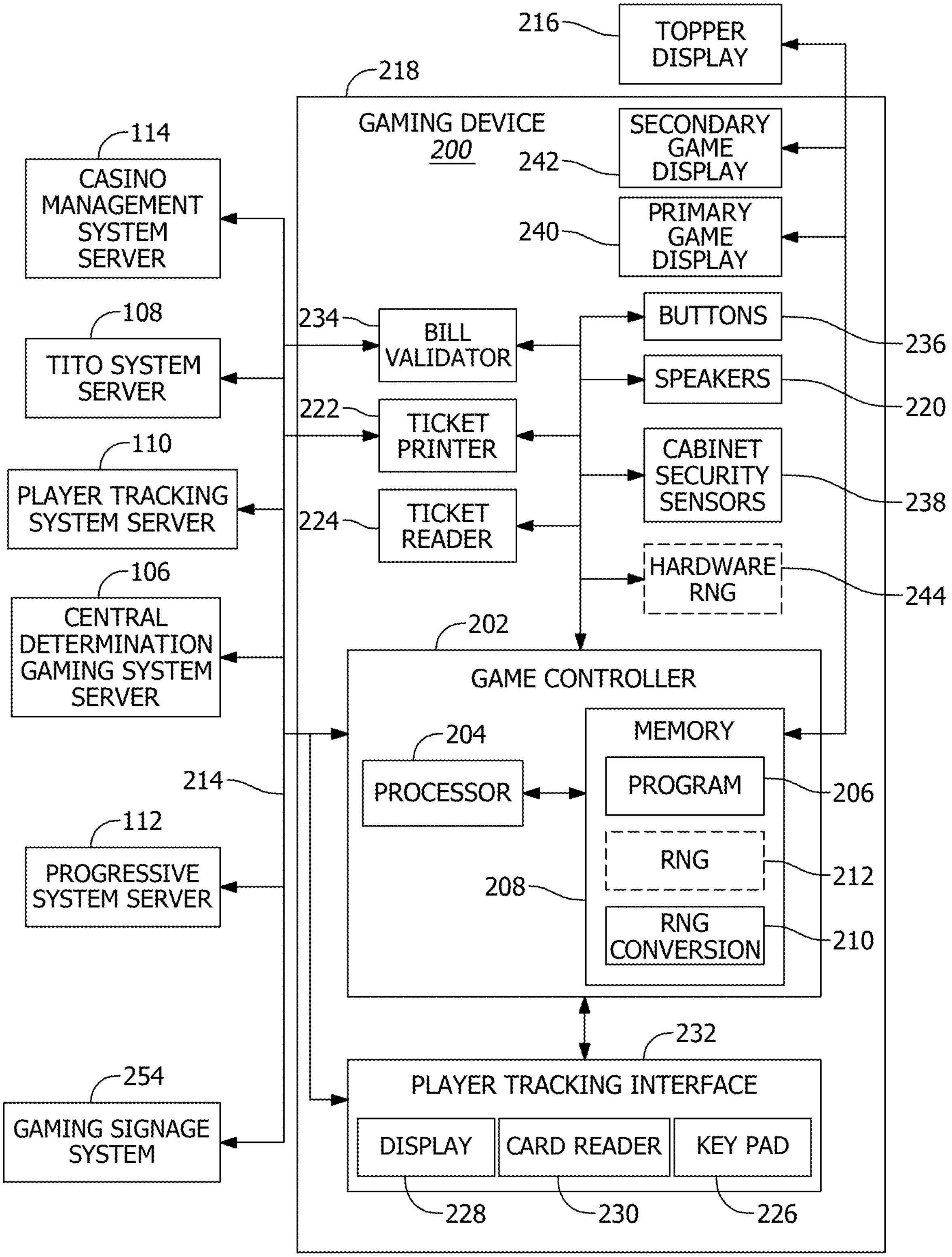
FIG. 2A is a block diagram showing various functional elements of an exemplary EGM.

Many or all the above-described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play, or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random-access memory (SRAM), dynamic random-access memory (DRAM), magnetic random-access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI))

to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. In general, volatility refers to the frequency or probability of an event such as a special mode, a payout, etc. For example, for a target level of RTP, a higher-volatility game may have a lower payout most of the time with an occasional bonus having a very high payout, while a lower-volatility game has a steadier payout with more frequent bonuses of smaller amounts. Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
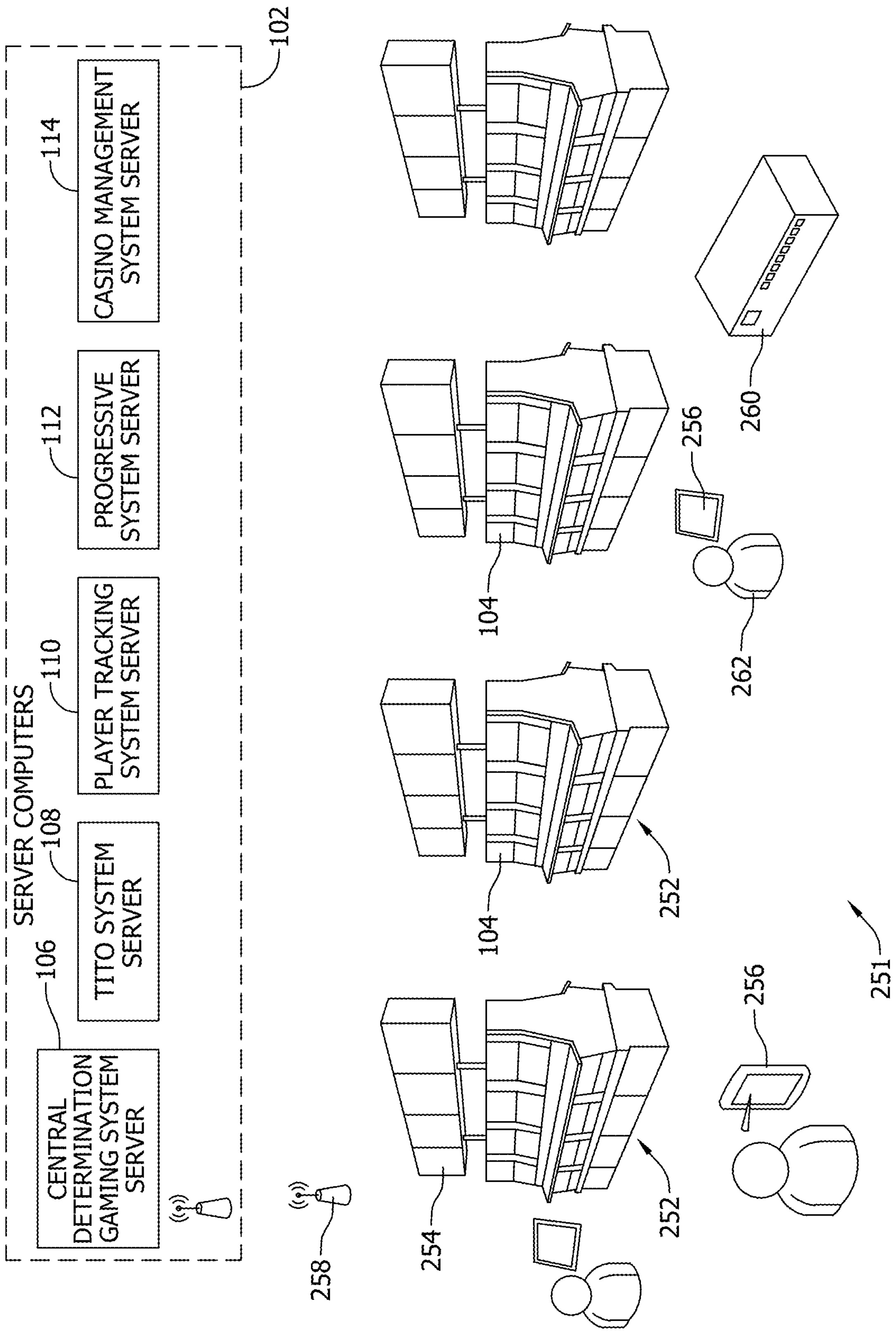
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
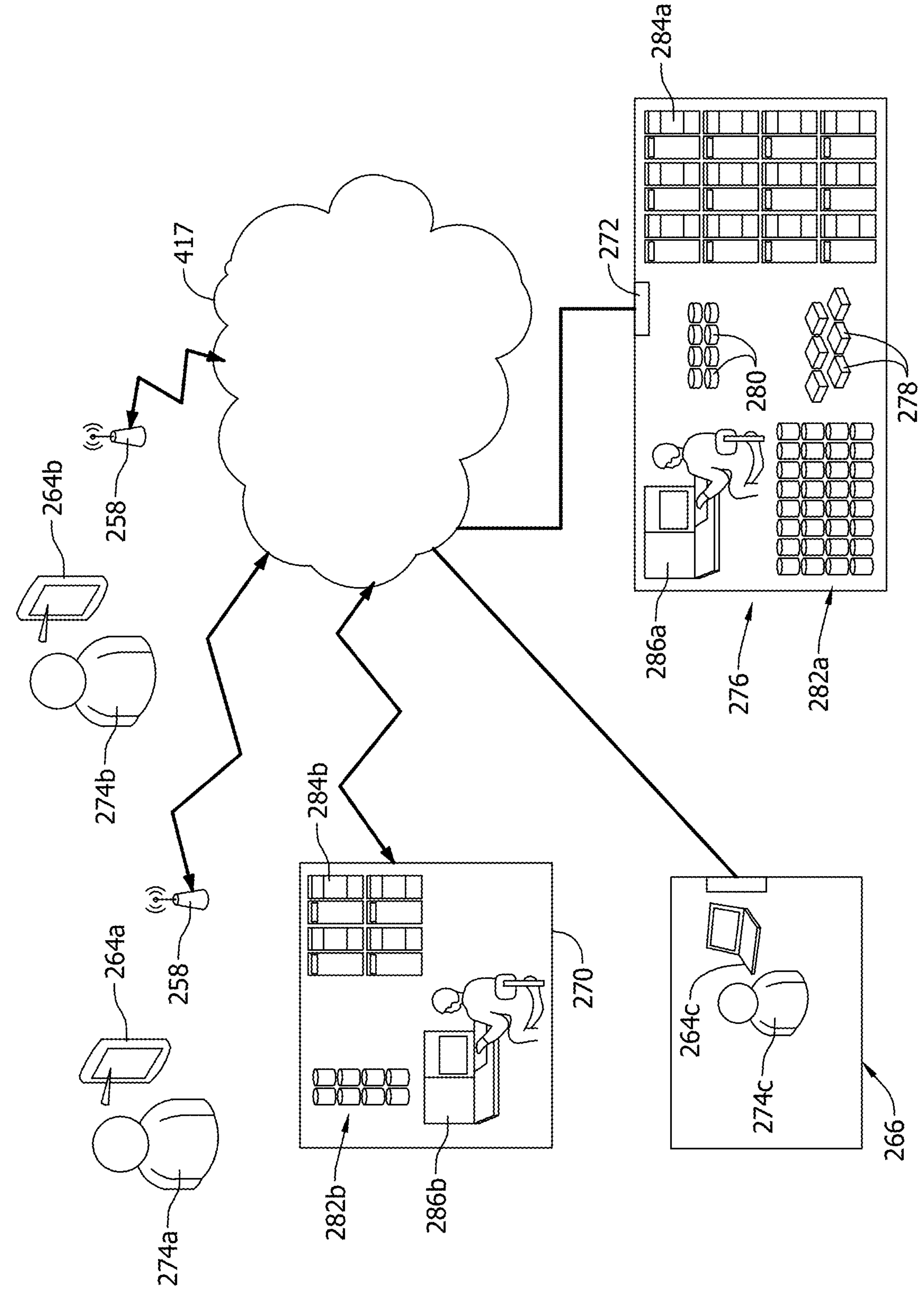
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types, and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
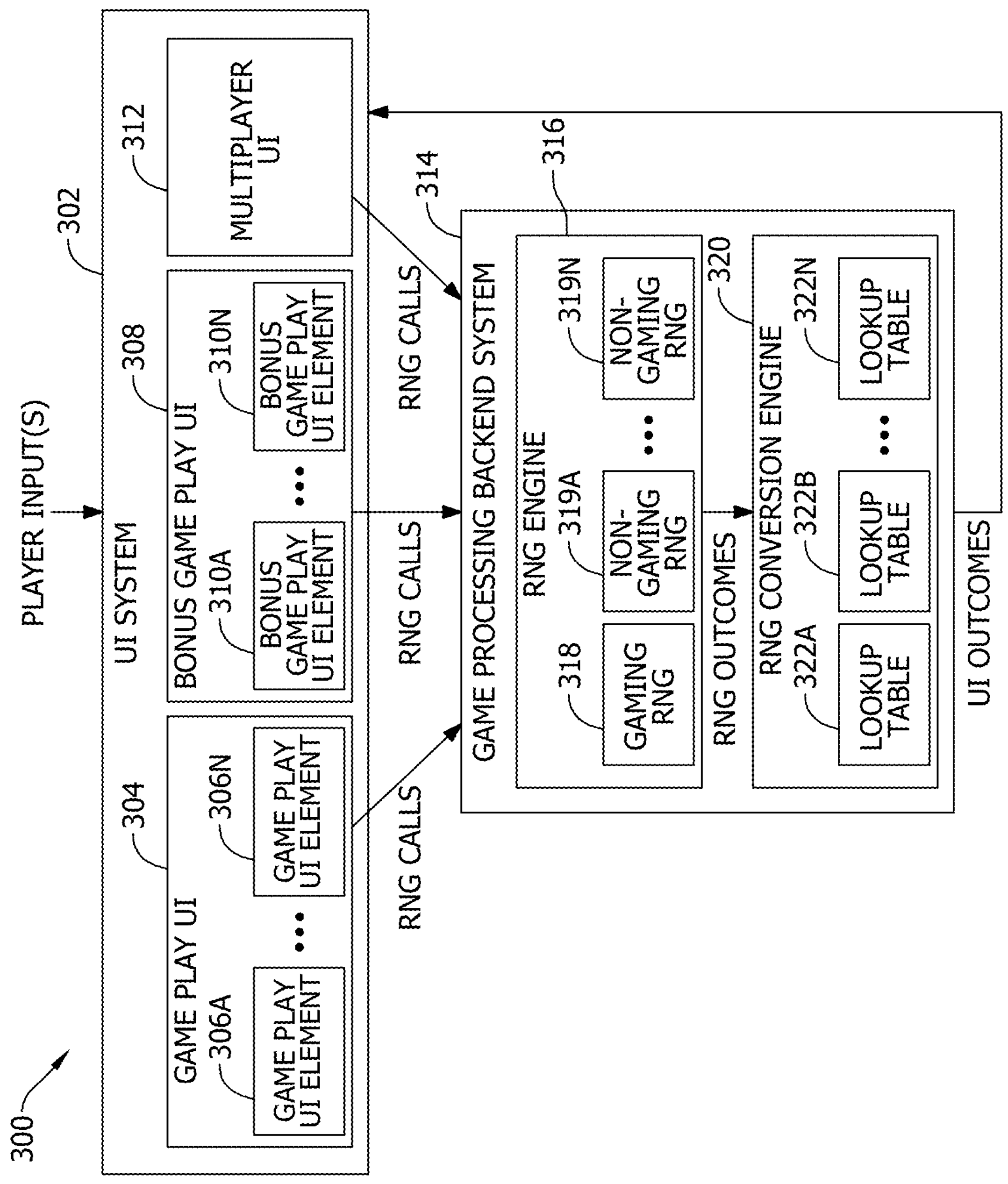
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with a UI system 302 receiving one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, or additionally, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

In some embodiments, the UI outcome received by the UI system 302 during the base game, may trigger a free spin bonus game, a hold and spin bonus feature, and/or a night frenzy mode feature, as described herein. Various embodiments are described in more details with respect to FIGS. 4A-4F, 5A-5F, 6A-6J, and 7.

Figure 4A:
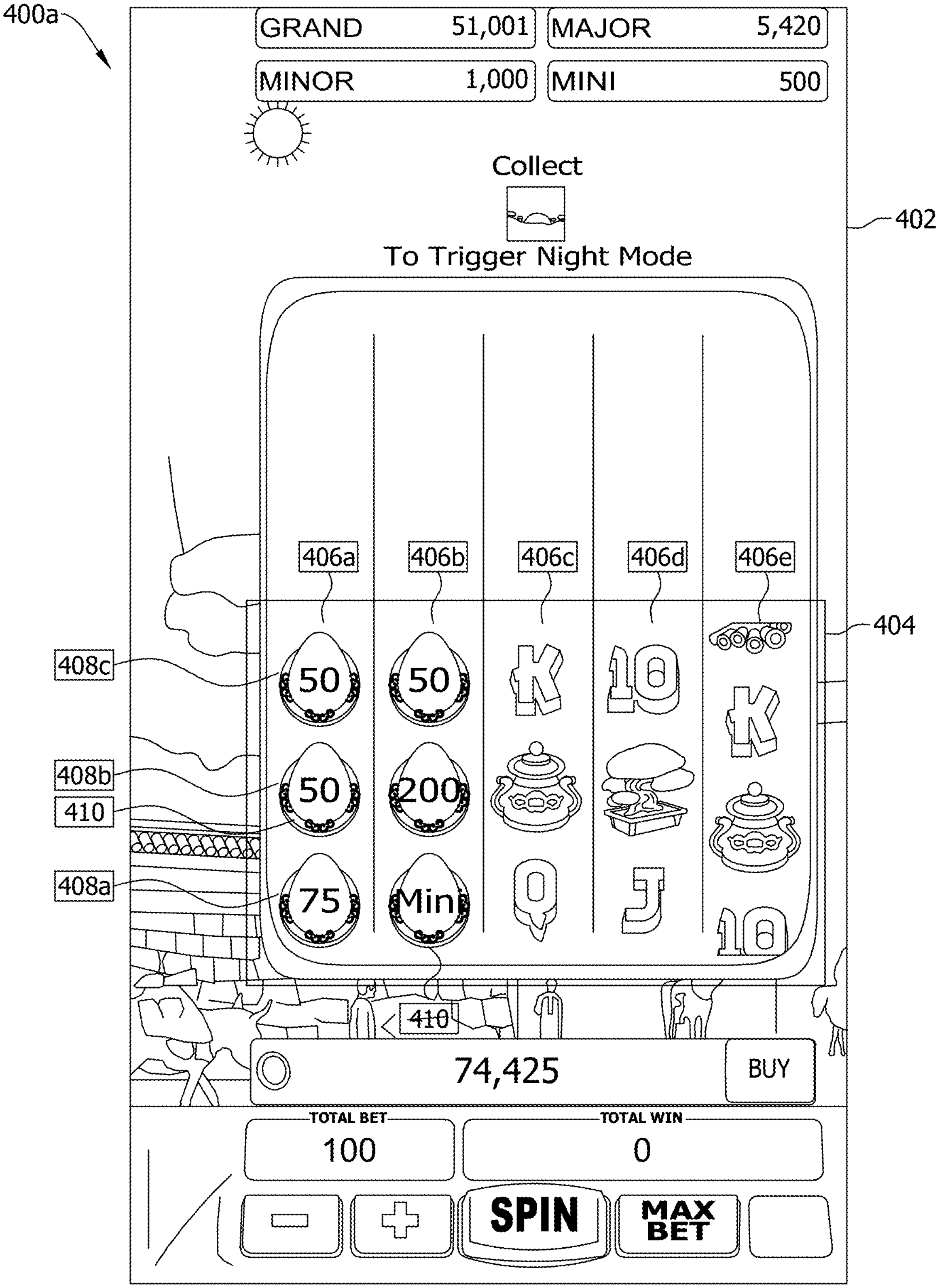
FIGS. 4A-4F each illustrates an exemplary screen view or user interface of an electronic gaming device during a hold and spin (HNS) feature, in accordance with certain embodiments of the present disclosure.
Figure 4B:
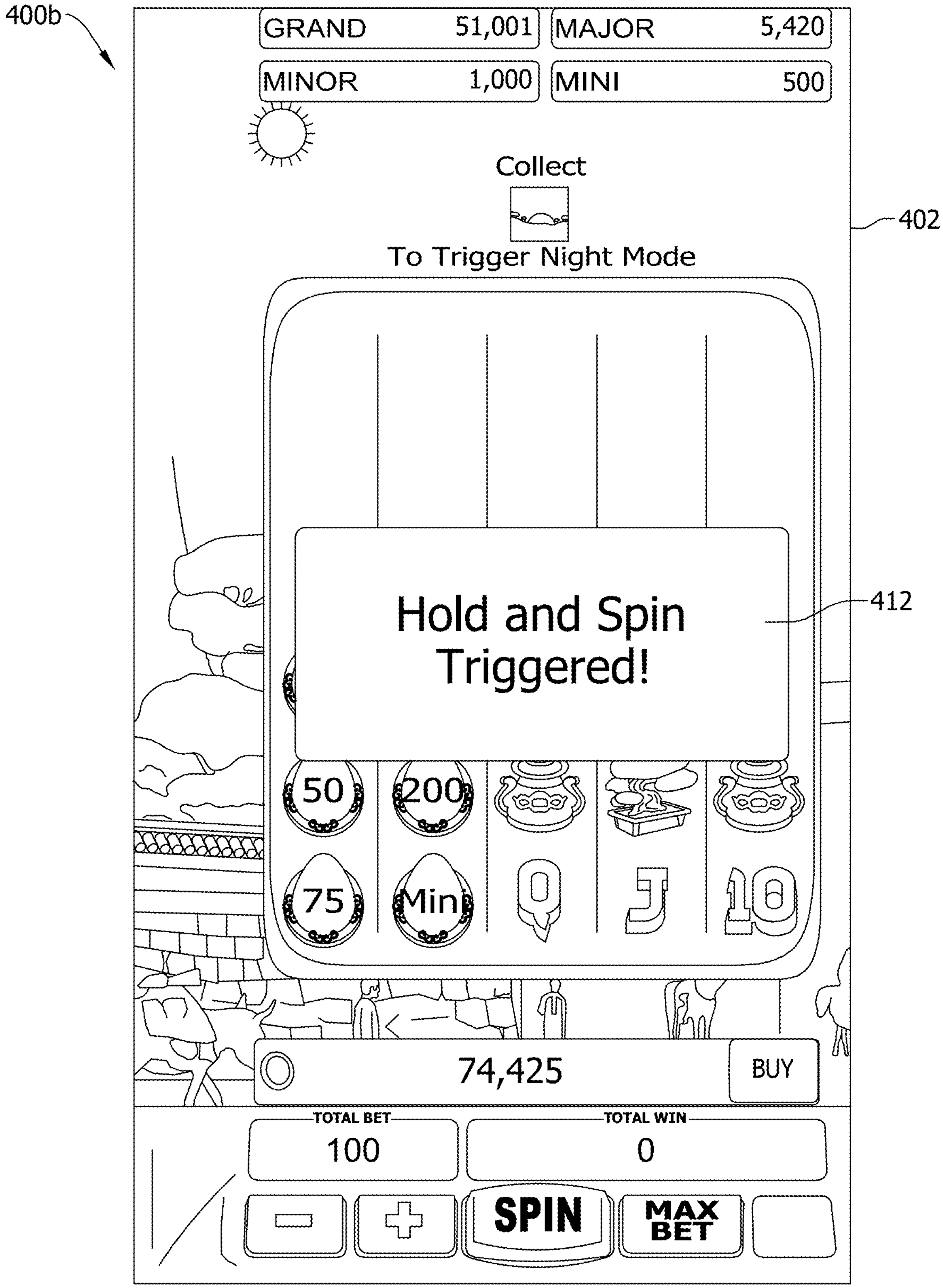

FIGS. 4A-4F illustrate exemplary full or partial screen views or user interfaces of an electronic gaming device during a base game play, a hold and spin (HNS) bonus feature, a night frenzy mode feature, and/or transition from the base game play to the HNS bonus feature and/or the night frenzy mode feature in accordance with the present disclosure. In an exemplary screen view 400*a* as shown in FIG. 4A, a display device of an electronic gaming device 402 displays a game play matrix or a reel matrix 404 that includes a plurality of reels (e.g., 5 reels) 406*a*-406*e* and each reel of the reels 406*a*-406*e* includes game symbol positions in multiple rows (e.g., 3 rows) 408*a*-408*c*. The reel matrix 404 shown in FIG. 4A is a reel matrix corresponding to a base game play instance. Upon receiving a player input including a credit amount and/or spin input during a game instance, the game symbols are displayed within the symbol positions of the reel matrix 404. The symbols displayed in the symbol positions of the reel matrix 404 may include trigger symbols and/or other picture symbols. By way of a non-limiting example, trigger symbols may include one or more cash-on-reel (COR) symbols, a Mini Jackpot symbol, a Major Jackpot symbol, a Minor Jackpot symbol, and/or a Grand Jackpot symbol. In FIG. 4A, COR symbols and the Mini Jackpot symbol are shown as 410. As described herein, because at least a particular number of predesignated symbols, for example, 6 predesignated symbols including 5 COR symbols 410 and a Mini Jackpot symbol 410 are stored in memory as a trigger event, an HNS bonus feature is triggered in the case of FIG. 4A. As shown in another exemplary screen view 400*b* as shown in FIG. 4B, the player may be informed that the HNS bonus feature is triggered by displaying a message as an overlay 412 on the display device of the electronic gaming device 402.

Figure 4C:
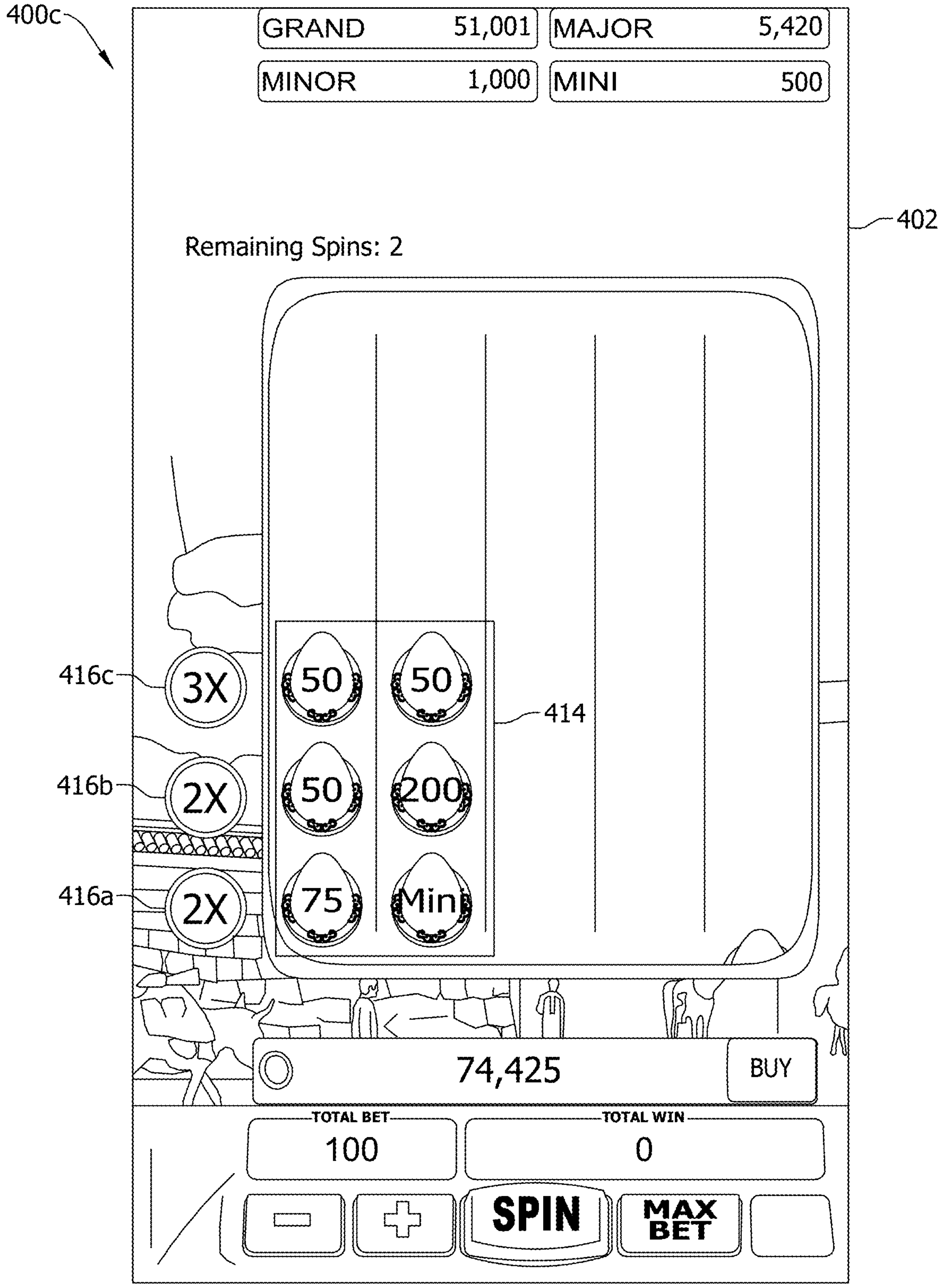

In an exemplary screen view 400*c* shown in FIG. 4C, the predesignated symbols that triggered the HNS bonus feature are displayed during a first game instance of the HNS bonus feature. In other words, the predesignated symbols that triggered the HNS bonus feature are now persistent symbols during the HNS bonus feature, which are displayed on the display device of the electronic gaming device 402 during remaining game instances of the HNS bonus feature as shown in FIG. 4C as 414. Additionally, for the reel matrix 404 presently including 3 rows 408*a*-408*c*, a list of multipliers may be randomly selected using an RNG and displayed as shown in FIG. 4C. In FIG. 4C, multipliers 416*a*, 416*b*, 416*c* are associated with rows 408*a*, 408*b*, and 408*c*, respectively. Based on the displayed list of multipliers on the display device of the electronic gaming device 402, the player may be aware that his or her award for a row would be multiplied by the displayed respective multiplier value when certain predesignated conditions are met for the row.

Figure 4D:
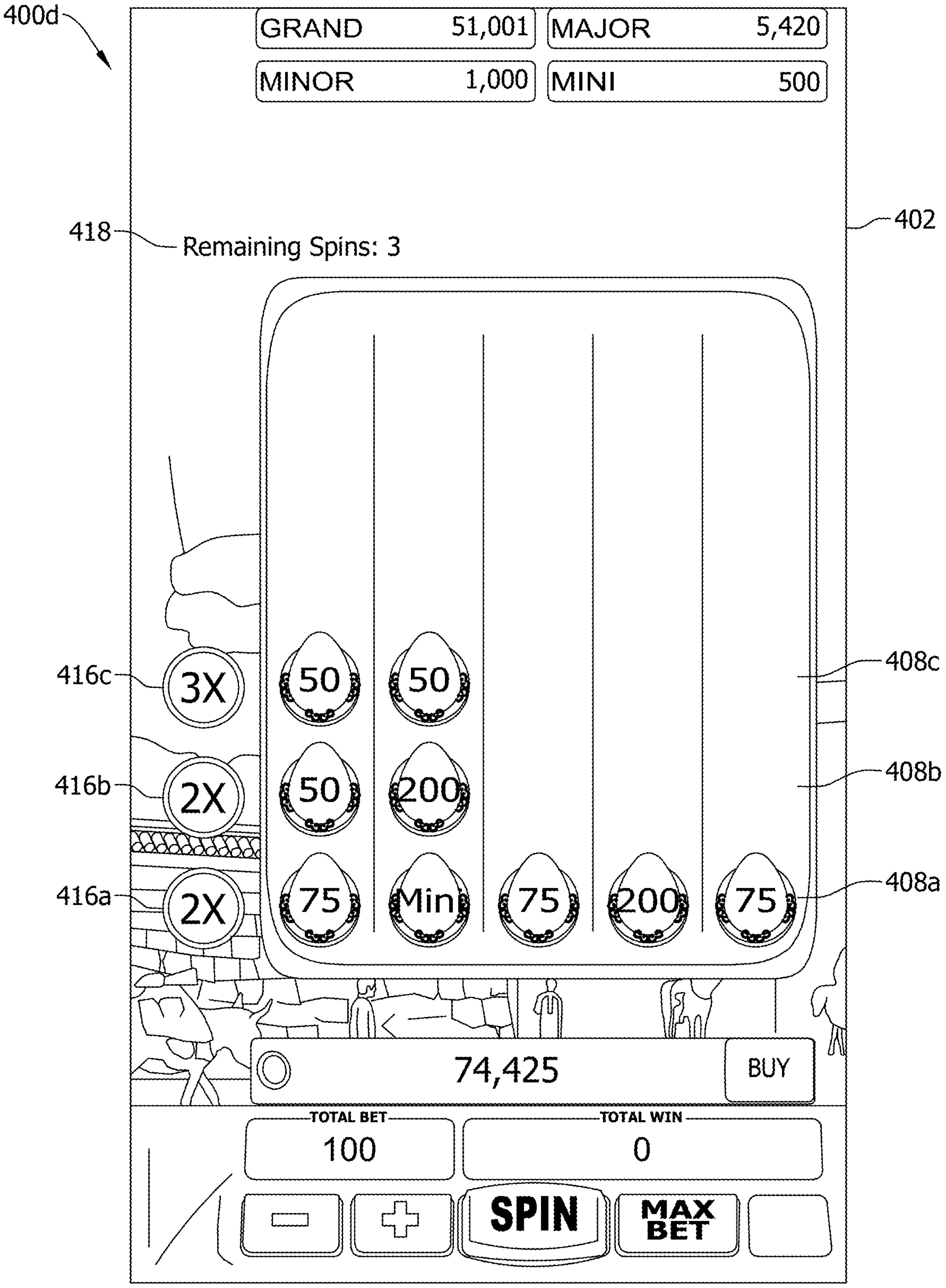
Figure 4E:
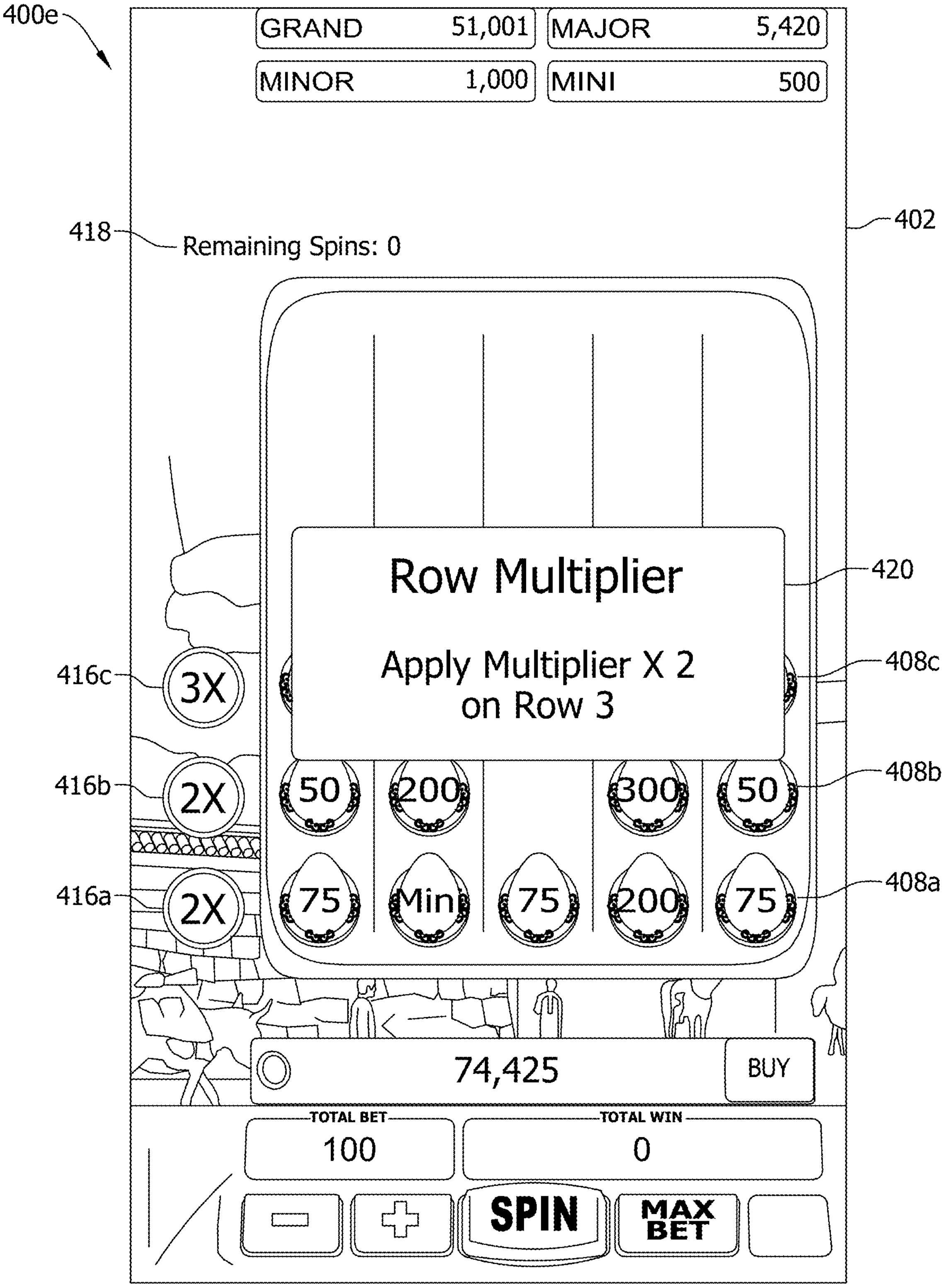
Figure 4F:
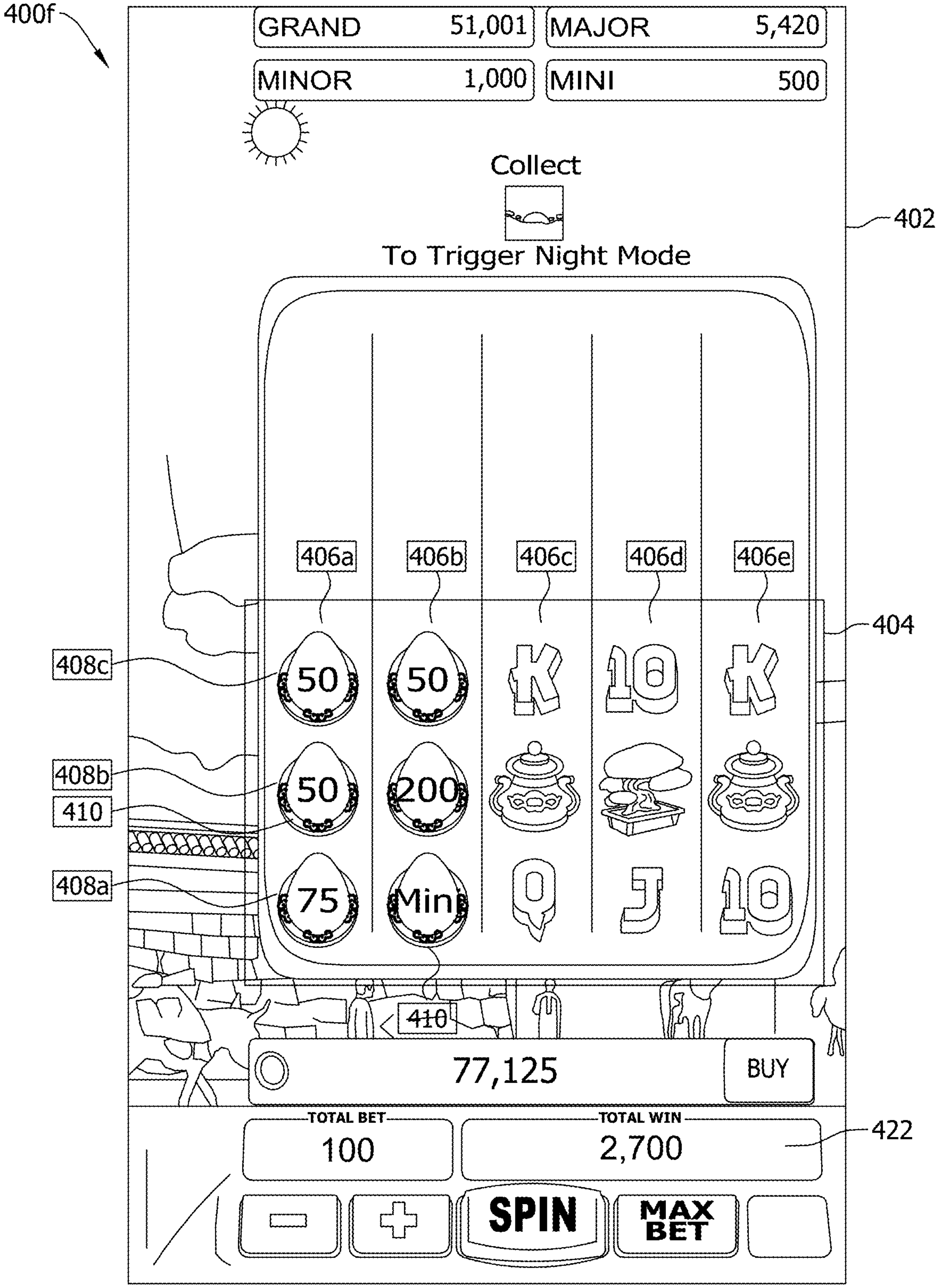

As shown in an exemplary screen view 400*d* in FIG. 4D, all symbol positions in the row 408*a* of the reel matrix 404 include the predesignated symbols, for example, the COR symbols 410 and a Mini Jackpot symbol 410, and thus the player's award value corresponding to the symbols displayed in symbol positions of the row 408*a* may be multiplied by a multiplier value 416*a*. As shown in an exemplary screen view 400*e* in FIG. 4E, a message informing the player that his or her award corresponding to the row 408*a* will be multiplied by a multiplier value 416*a* may be displayed as an overlay 420 on the currently displayed content on the display device of the electronic gaming device 402. Additionally, or alternatively, a number of remaining spins 418 may be displayed on the display device of the electronic gaming device 402 as shown in FIG. 4D and FIG. 4E. The player's total award value may be updated and displayed as shown in an exemplary screen view 400*f* of FIG. 4F as 422, and when the number of remaining spins 418 becomes 0, the player is returned to the base game play at which the HNS bonus feature was triggered. In some embodiments, and by way of a non-limiting example, the overlay 420 may be displayed when a condition for the player to have the award value being multiplied by a multiplier value is met. The overlay 420 may be displayed separately for each row for which a condition for the player to have the award value being multiplied by a multiplier value is met. Alternatively, a single overlay 420 may be displayed for all rows for which the condition for the player to have the award value being multiplied by a respective multiplier value is met. In some embodiments, the overlay 420 is displayed separately for each row for which the condition for the player to have the award value being multiplied by the respective multiplier value is met, during the HNS bonus feature.

Figure 5A:
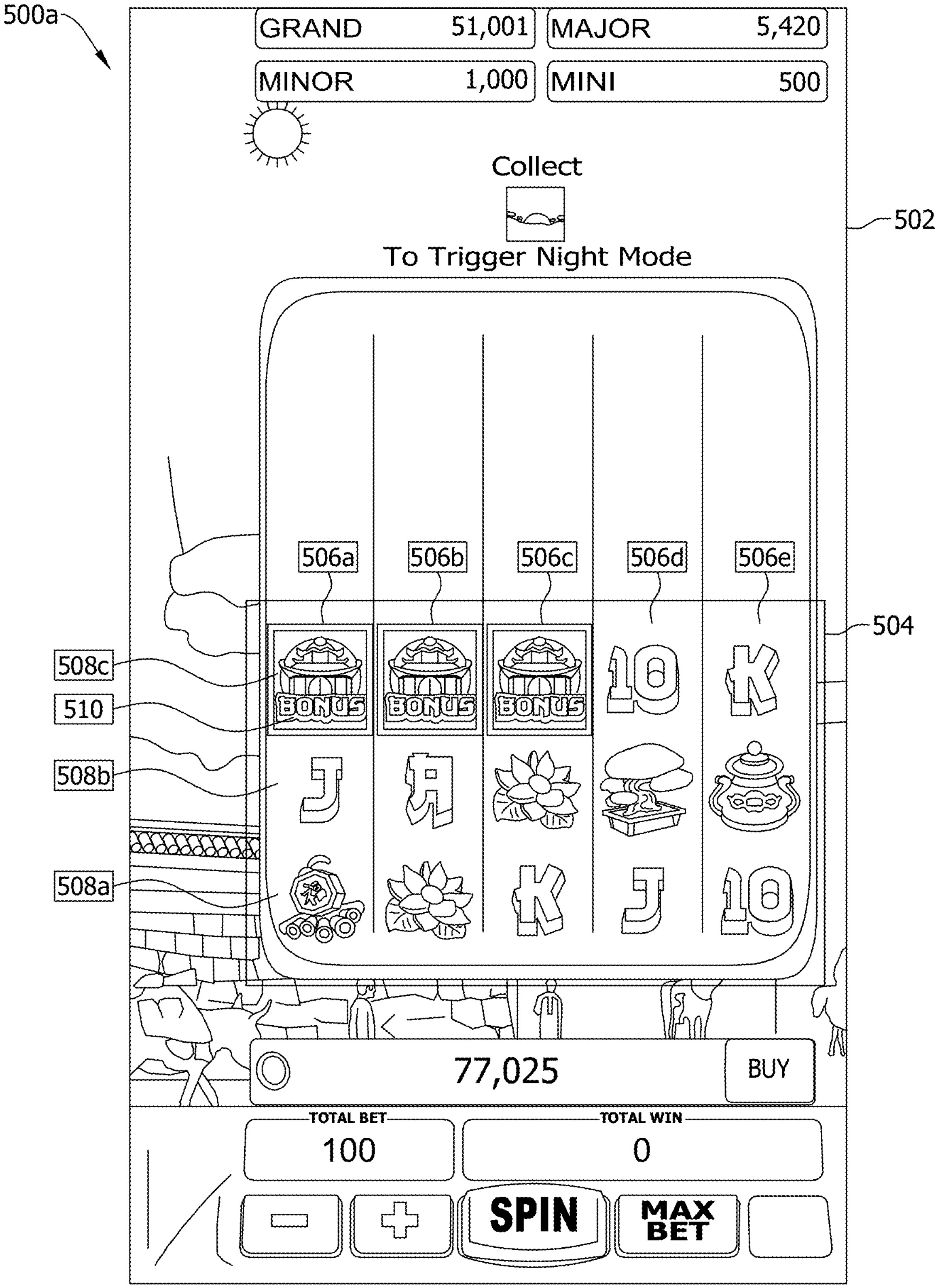
FIGS. 5A-5F each illustrates an exemplary screen view or user interface of an electronic gaming device during a free spin bonus game feature, in accordance with certain embodiments of the present disclosure.

FIGS. 5A-5F illustrate exemplary full or partial screen views or user interfaces of an electronic gaming device during a base game play, a free spin bonus game, a night frenzy mode feature, and/or transition from the base game play to the free spin bonus game and/or the night frenzy mode feature. In an exemplary screen view 500*a* as shown in FIG. 5A, a display device of an electronic gaming device 502 displays a game play matrix or a reel matrix 504 that includes a plurality of reels (e.g., 5 reels) 506*a*-506*e* and each reel of the reels 506*a*-506*e* includes game symbol positions in multiple rows (e.g., 3 rows) 508*a*-508*c*. The reel matrix 504 shown in FIG. 5A may be a reel matrix corresponding to a base game play instance. Upon receiving a player input including a credit amount and/or spin input during a game instance, the game symbols are displayed within the symbol positions of the reel matrix 504. The symbols displayed in the symbol positions of the reel matrix 504 may include trigger symbols and/or other picture symbols. By way of a non-limiting example, the trigger symbols may include one or more cash-on-reel (COR) symbols, a Mini Jackpot symbol, a Major Jackpot symbol, a Minor Jackpot symbol, and/or a Grand Jackpot symbol.

Figure 5B:
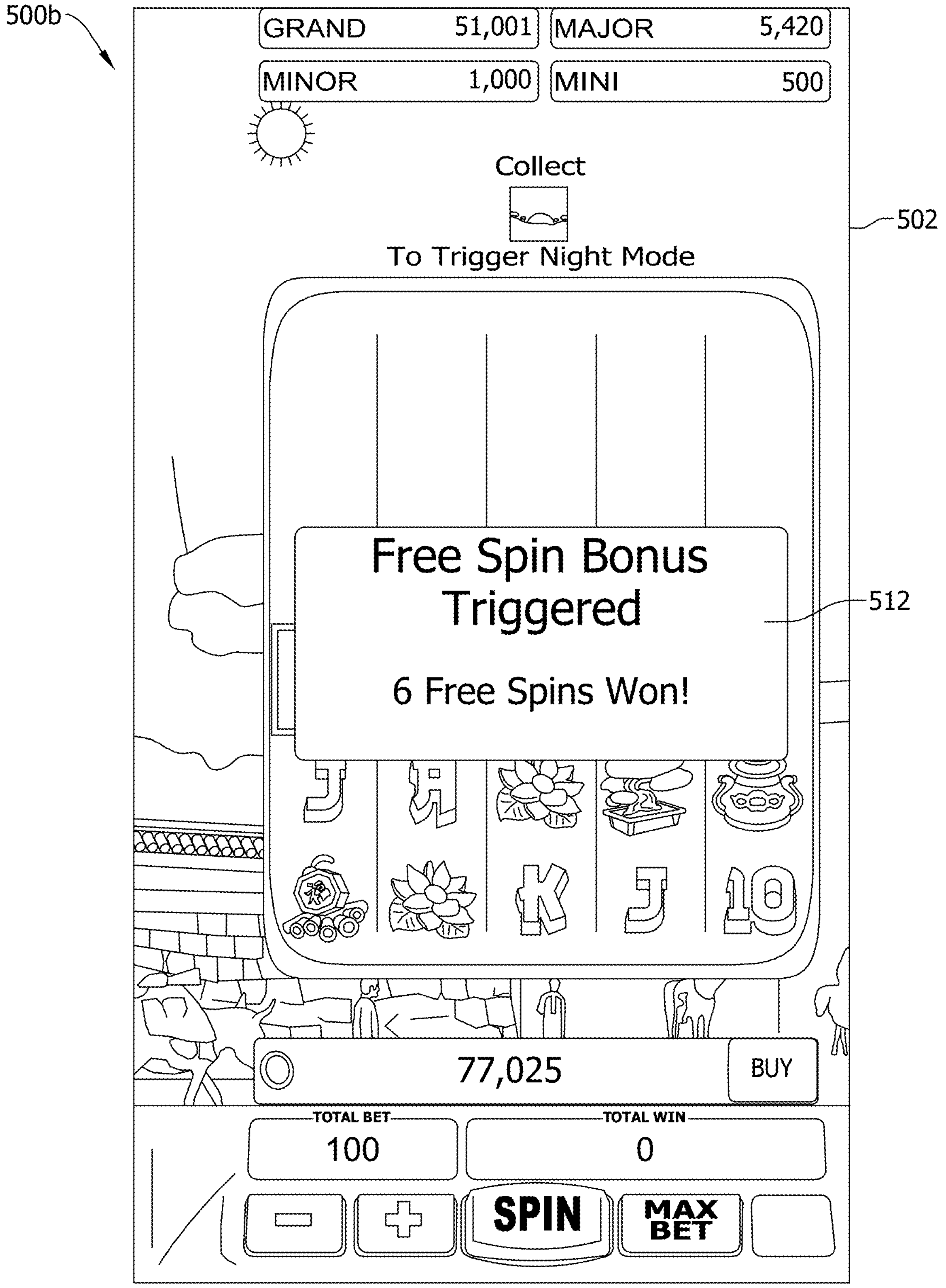

In FIG. 5A, bonus symbols are shown as 510. As described herein, because at least a particular number of predesignated symbols, for example, 3 bonus symbols land and are displayed in symbol positions in the reel matrix 504, the free spin bonus game is triggered in the case of FIG. 5A. As shown in another exemplary screen view 500*b* as shown in FIG. 5B, the player may be informed that the free spin bonus game is triggered by displaying a message as an overlay 512 on the display device of the electronic gaming device 502. The player may be awarded 6, 9, or 15 free spin bonus games when 3, 4, or 5 bonus symbols, respectively, land and are displayed on the reel matrix 504 during the electronic base game play. Additionally, or alternatively, a number of free spin bonus games awarded to the player may be configurable and may be awarded based upon a number of bonus symbols displayed in symbol positions on the reel matrix 504 during the base game play instance.

Figure 5C:
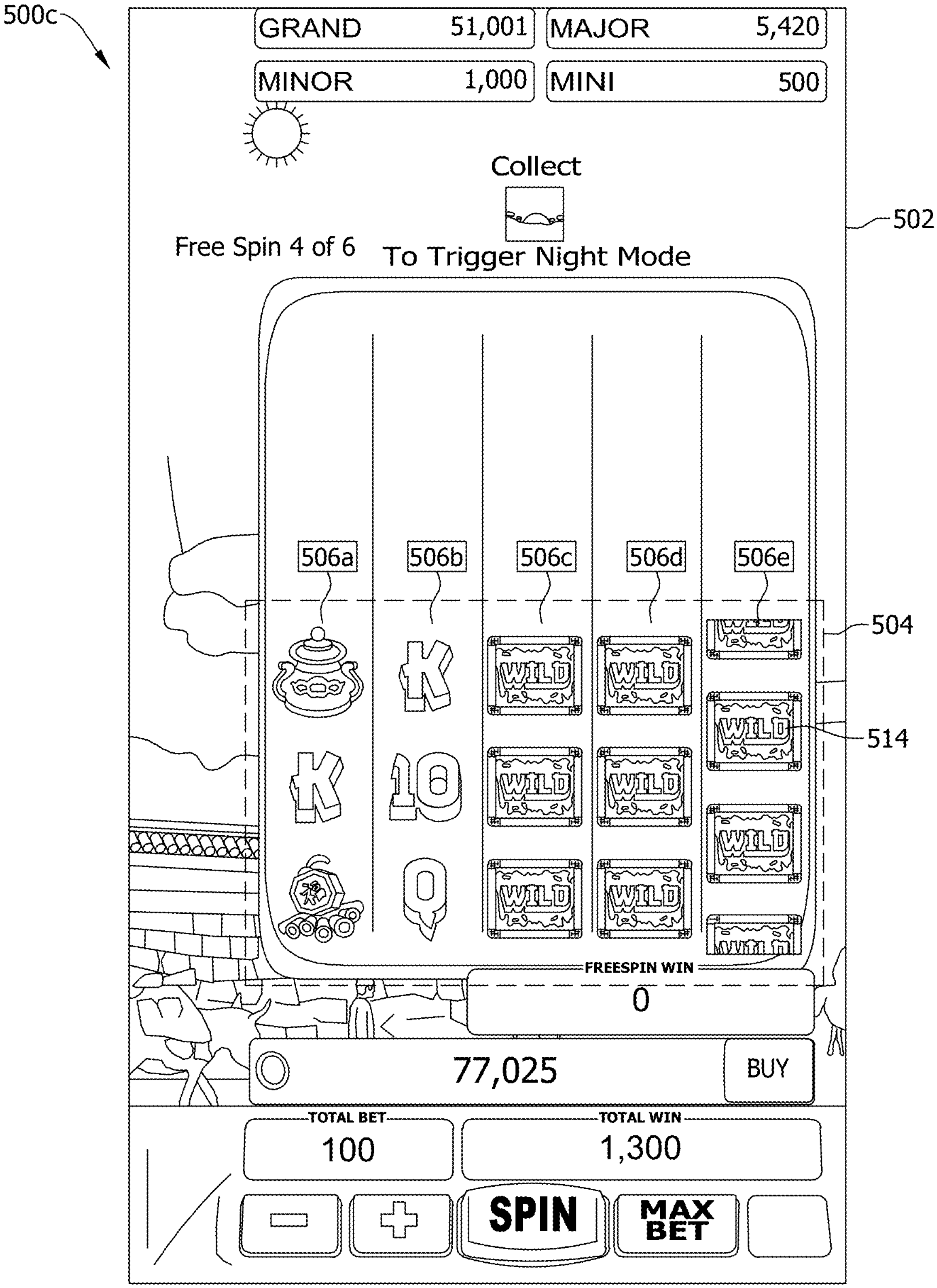

In an exemplary screen view 500*c* shown in FIG. 5C, all game symbol positions of the reel matrix 504 for the reels 506*a*-506*e* may be refreshed and displayed on the display device of the electronic gaming device 502. During the free spin bonus game, at least one reel of the reels 506*a*-506*e* may display a wild symbol 514 in all symbol positions. As shown in FIG. 5C, reels 506*c* and 506*d* have wild symbols 514 in each symbol position during the free spin bonus game. Additionally, or alternatively, a different number of reels and/or different reels may have a wild symbol 514 in each symbol position during different spins of the free bonus game feature.

Figure 5D:
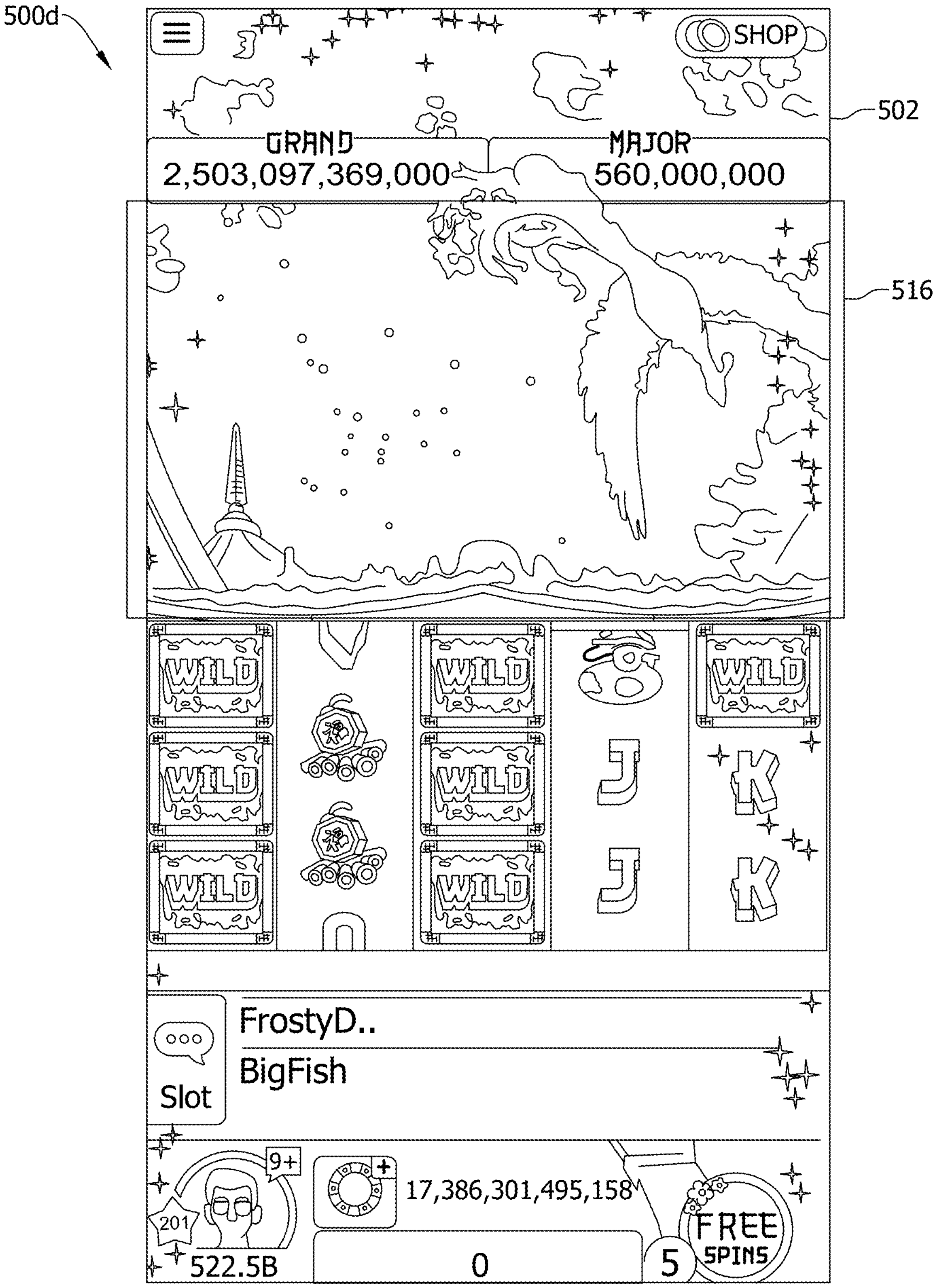

As shown in an exemplary screen view 500*d* shown in FIG. 5D, the display device of the electronic gaming device 502 may display the reel matrix in a lower portion of the display device and an animation section 516 in an upper portion of the display device. The animation displayed in the animation section 516 may show an object moving about the section 516 and over the reels. In one embodiment, the object may include a bird (e.g., a Phoenix) flying from the left to the right. The animation may also include certain audio and/or visual effects to get the player's attention to the animation section 516. In the example embodiment, the Phoenix is displayed as flying over a reel of the reel matrix and subsequently all symbol positions in the reel of reel matrix display wild symbols 514 as shown in an exemplary screen view 500*e* shown in FIG. 5E. In other words, the animation appears to show the Phoenix flying over the reels while the wild symbols 514 are displayed in the reel positions behind the Phoenix. Although the example embodiment shows a Phoenix as part of the animation, other objects could be displayed and shown.

Figure 5E:
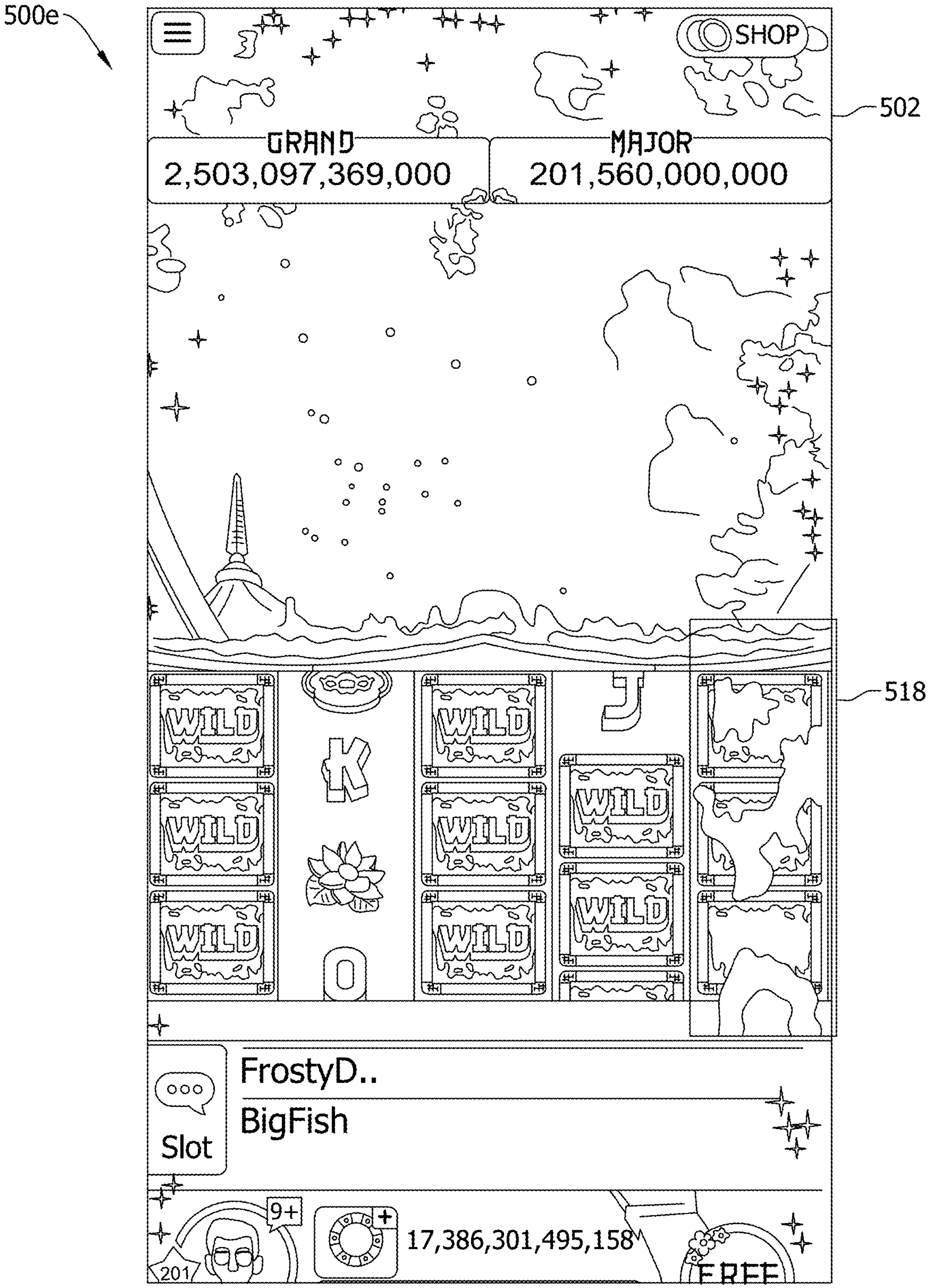
Figure 5F:
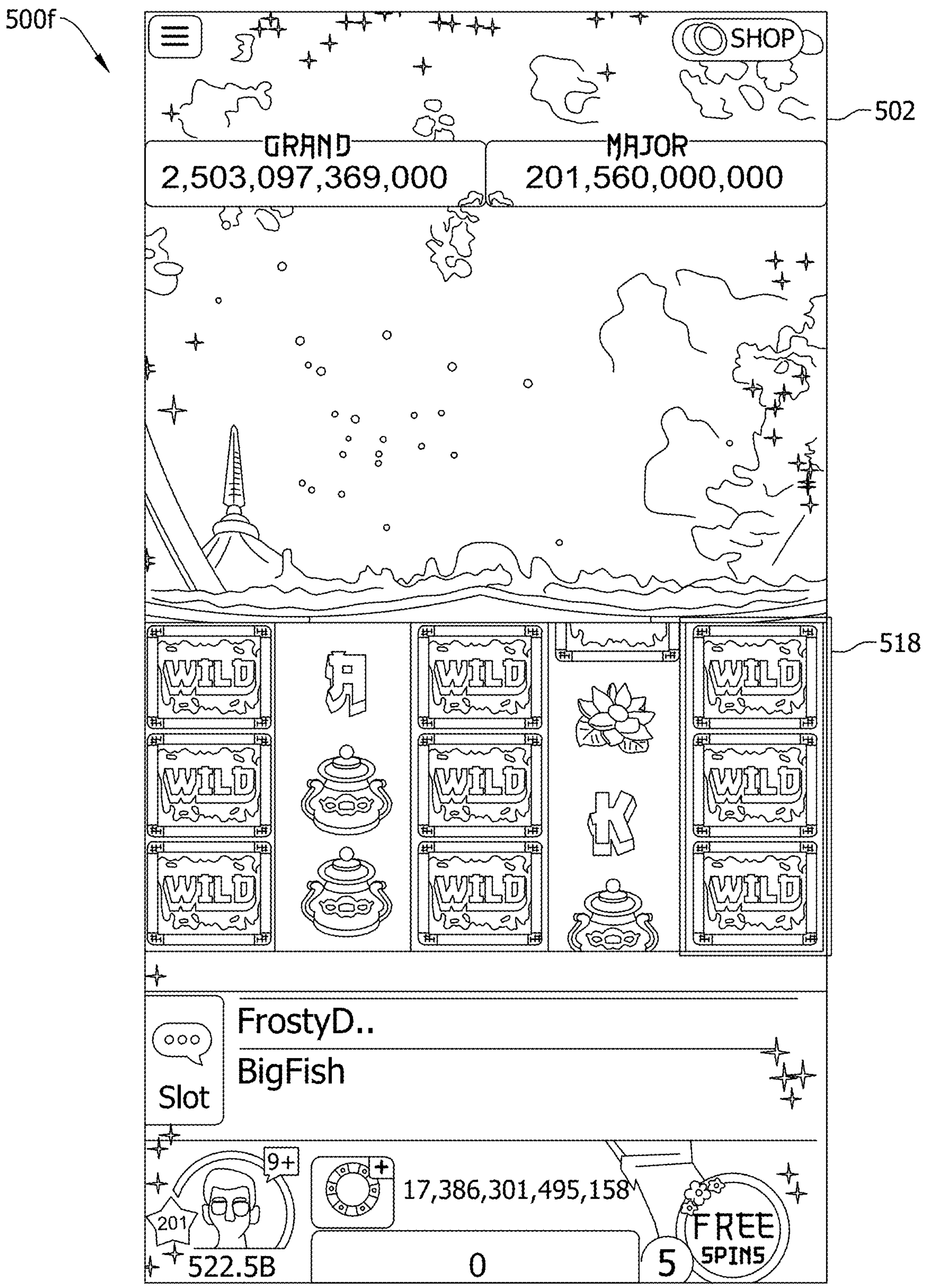

As shown in FIG. 5E, when the Phoenix is displayed as flying over a reel, for example, the reel 506*e*, an explosion animation 518 as shown in FIG. 5E may be displayed, and all symbol positions in the reel 506*e* may then display wild symbols 514 as shown in an exemplary screen view 500*f* in FIG. 5F. In some embodiments, after the free spin bonus feature is completed, the electronic game may return to the base game play instance.

As shown in FIGS. 4A-4F and FIGS. 5A-5F, when a collect symbol is displayed in a symbol position during game play, a timing animation showing the sun moving across a horizon may also be displayed. The sun may move, based upon the number of collect symbols that land and are displayed on the reel matrix during each spin. The moving sun indicating that the triggering of the night frenzy mode is getting closer to happening.

FIGS. 6A-6J illustrate exemplary full or partial screen views or user interfaces of an electronic gaming device during play of a base game in a day mode, and/or a transition from the base game play being played in the day mode to the night frenzy mode feature. As shown in FIGS. 4A-4F and FIGS. 5A-5F, the timing animation displays the sun moving from left to right along a slider when a collect symbol lands and is displayed on the reel matrix 404 or 504. For the sun to move completely from left to right and to trigger the night frenzy mode feature, in one example, a designated number (e.g., 100) of collect symbols are required to land and be displayed on the reel matrix 404 or 504 during multiple instances of the base game play. In other embodiments, the night frenzy mode may be randomly triggered during game play.

Figure 6A:
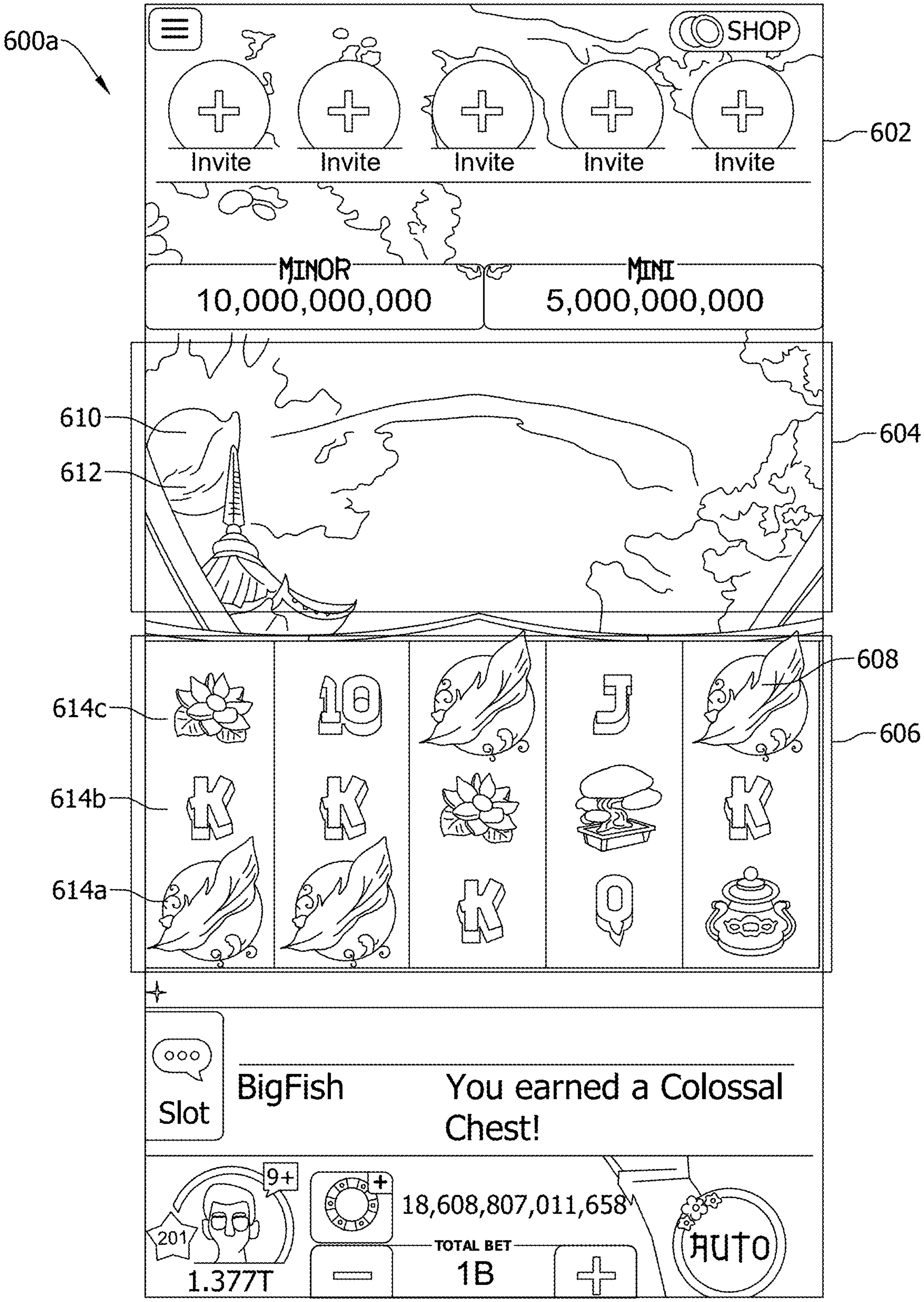
FIGS. 6A-6J each illustrates an exemplary screen view or user interface of an electronic gaming device during a day/night frenzy feature, in accordance with certain embodiments of the present disclosure.
Figure 6B:
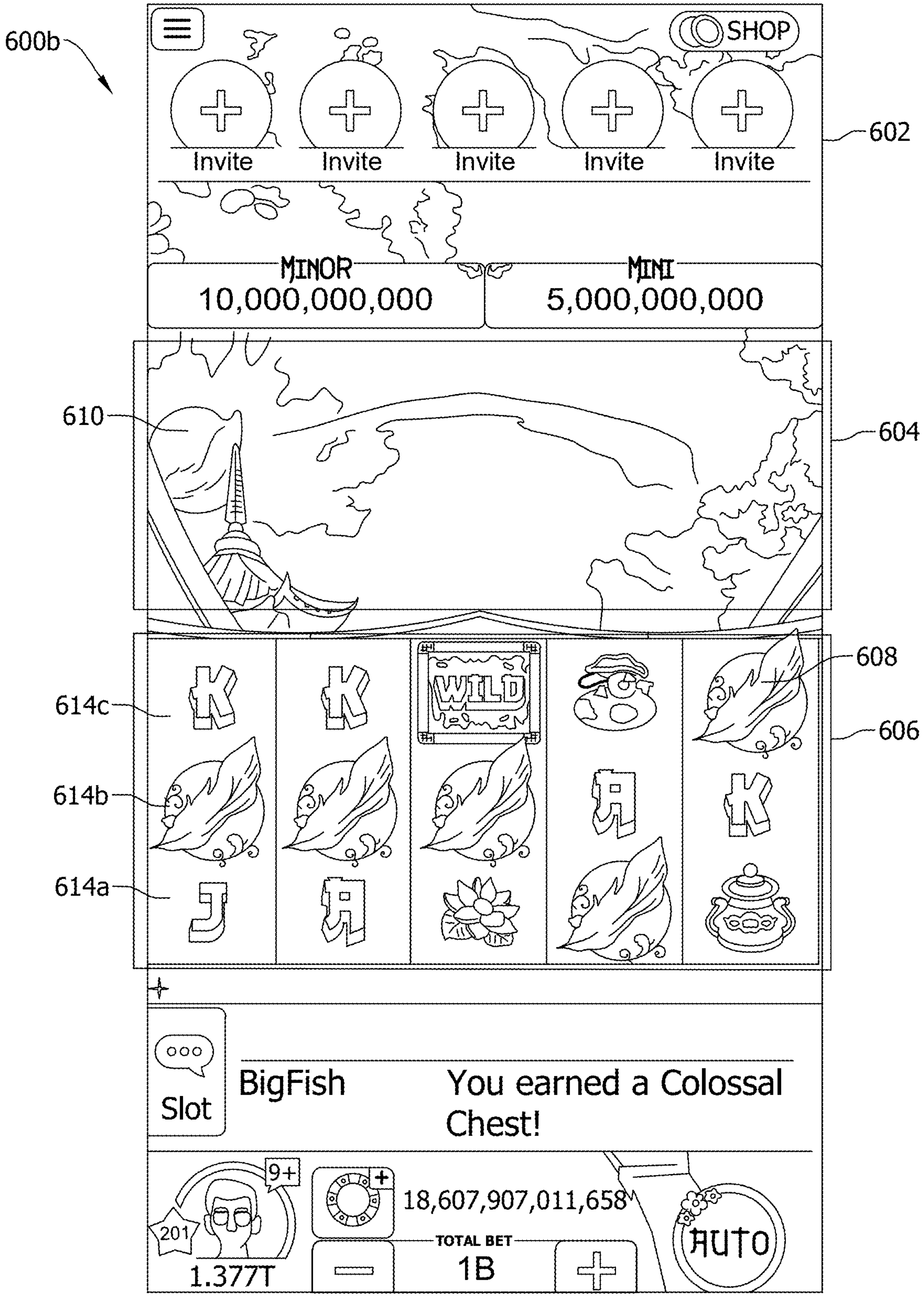

In an exemplary screen view 600*a* as shown in FIG. 6A, a display device of an electronic gaming device 602 displays a game play matrix or a reel matrix 606 including a plurality of reels (e.g., 5 reels (not labeled in FIG. 6A)) and each reel of the reels having game symbol positions in multiple rows (e.g., 3 rows) 614*a*-614*c*. The reel matrix 606 shown in FIG. 6A may be a reel matrix corresponding to a base game play instance being played in a day mode. Upon receiving a player input including a credit amount and/or spin input during a game instance, the game symbols are displayed within the symbol positions of the reel matrix 606. Additionally, the display device of the electronic gaming device 602 may include an animation section 604 in some portion of the display device. The animation section 604 may display a sun symbol 610 in the sky. In the example embodiment, the color of the sky is blue and includes one or more clouds.

Additionally, or alternatively, the animation section 604 may include other animations, for example, birds flying in the sky, etc. During the base game play instance, when a collect symbol shown in FIG. 6A as 608 lands and is displayed in a symbol position on the reel matrix 606, the sun symbol 610 may move from its current or initial position in the animation section 604 to another position spaced a distance away. The second position being along the horizon and is based upon a total number of collect symbols 608 landed and displayed on the reel matrix 606.

As described herein, 100 collect symbols 608 are required to move the sun symbol 610 from a starting position on the left side to a final position on the right side that triggers the night frenzy mode feature. In an exemplary screen view 600*b* shown in FIG. 6B, the sun symbol 610 may be displayed as being moved from its previous or original position shown in FIG. 6A. Movement of the sun symbol 610 may be based upon the number of collect symbols 608*s* landed and displayed in symbol positions on the reel matrix 606 during different spins.

Figure 6C:
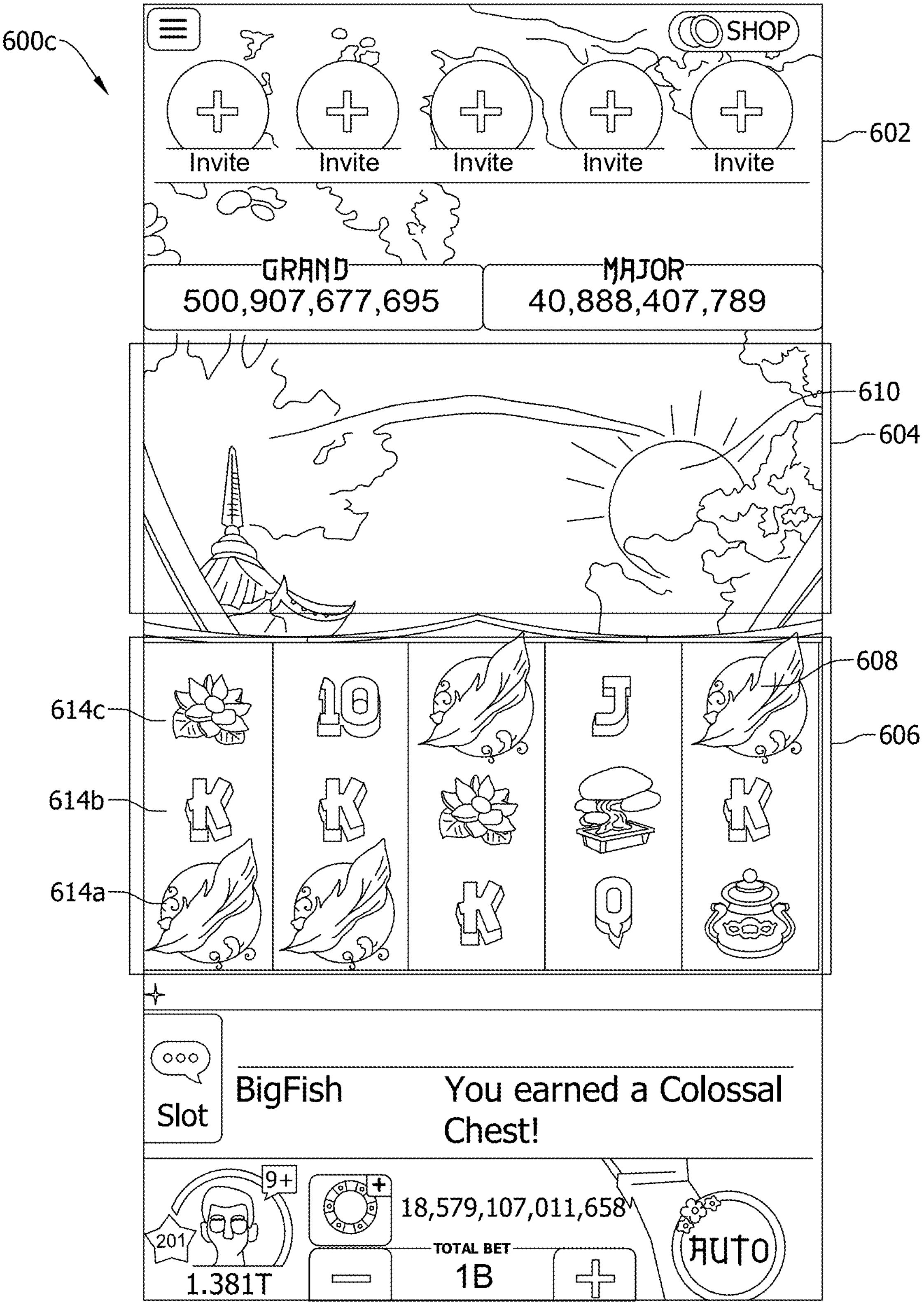
Figure 6D:
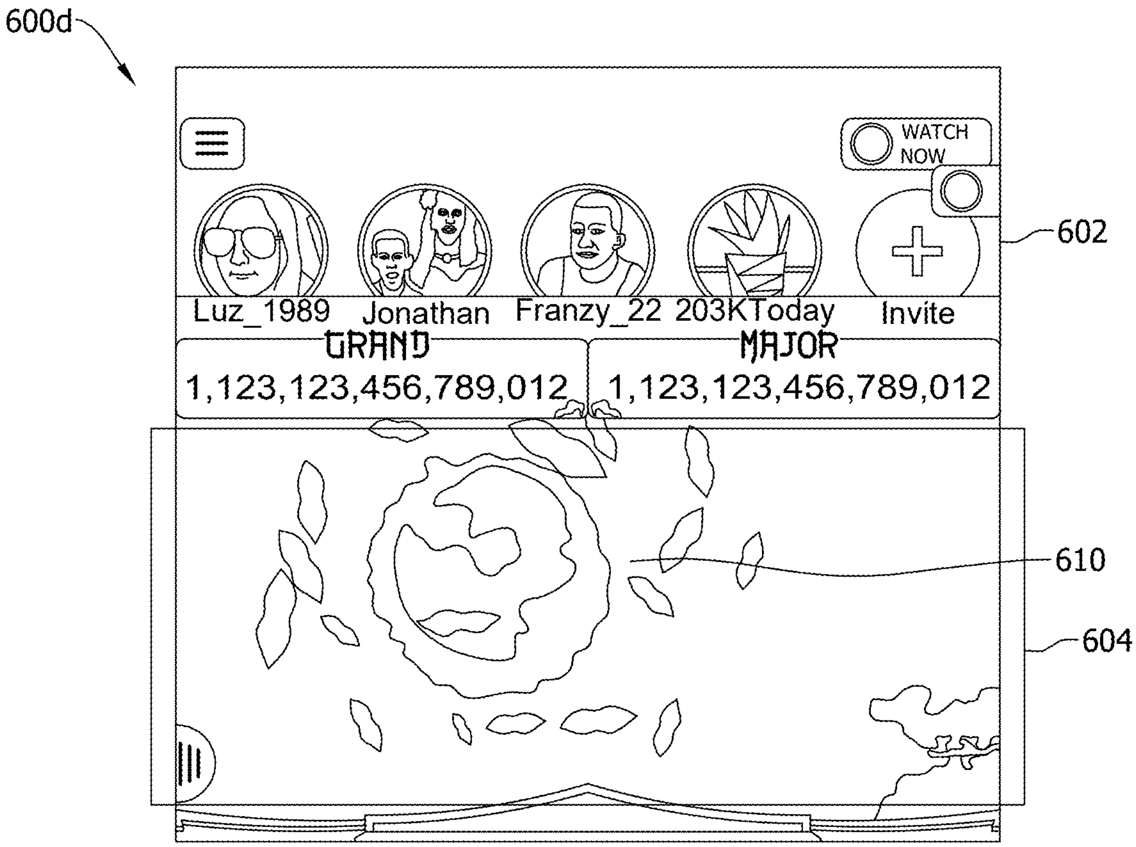
Figure 6E:
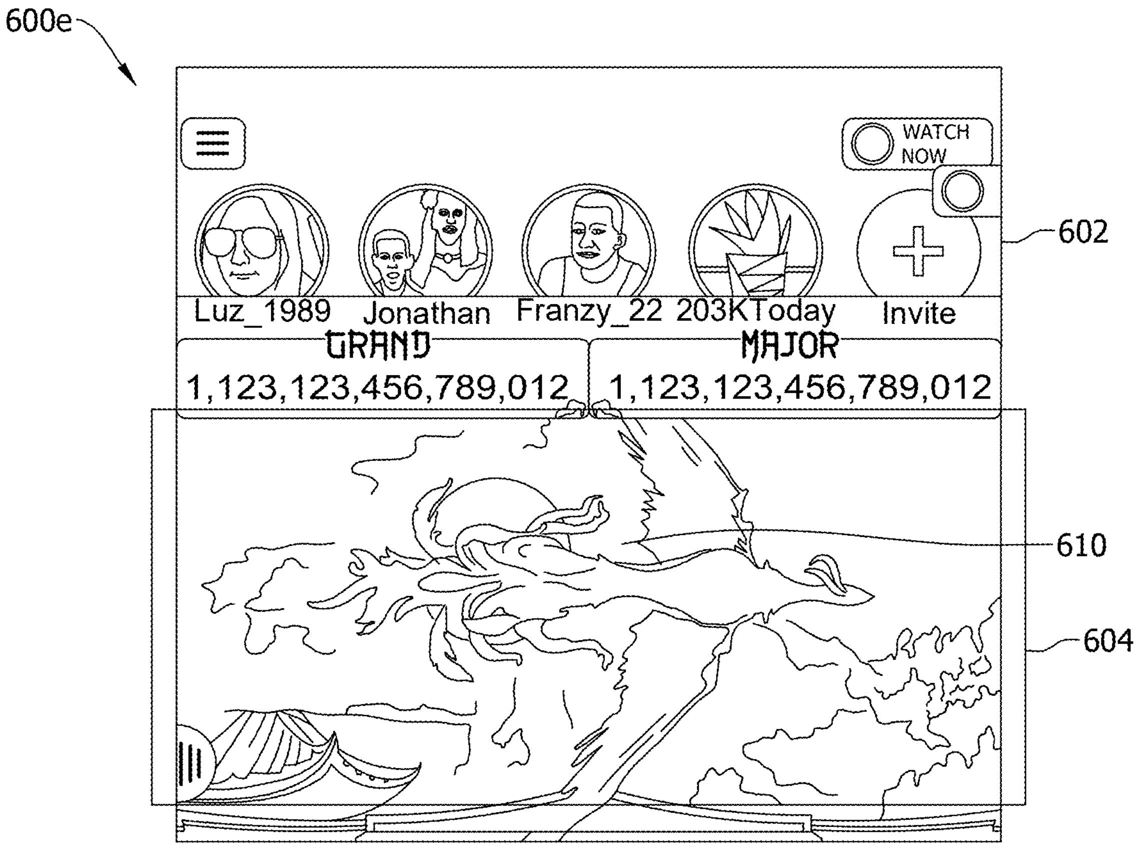

In an exemplary screen view 600*c* shown in FIG. 6C, when a total of 100 collect symbols 608 have landed and have been displayed on the reel matrix 606 during base game play instances, the sun symbol 610 is displayed on the far right-side of the animation section 604 triggering the night frenzy mode feature. Additionally, or alternatively, different animations including a feather 612 (shown in FIG. 6A) on the sun symbol 610, a wiggling feather symbol (not shown in FIGS. 6A-6J), and/or exploding feathers over the sun symbol 610 in the animation section 604 may be displayed. Additionally, or alternatively, as shown in an exemplary screen view 600*e* in FIG. 6E, a bird (e.g., a Phoenix) flying across the sun symbol 610 may be displayed in the animation section 604. When the Phoenix is displayed as flying across the sun symbol 610 in the animation section 604, the night frenzy feature may be randomly triggered without requiring the 100 count of collect symbols 608 being displayed on the reel matrix 606 during multiple instances of the base game.

Figure 6F:
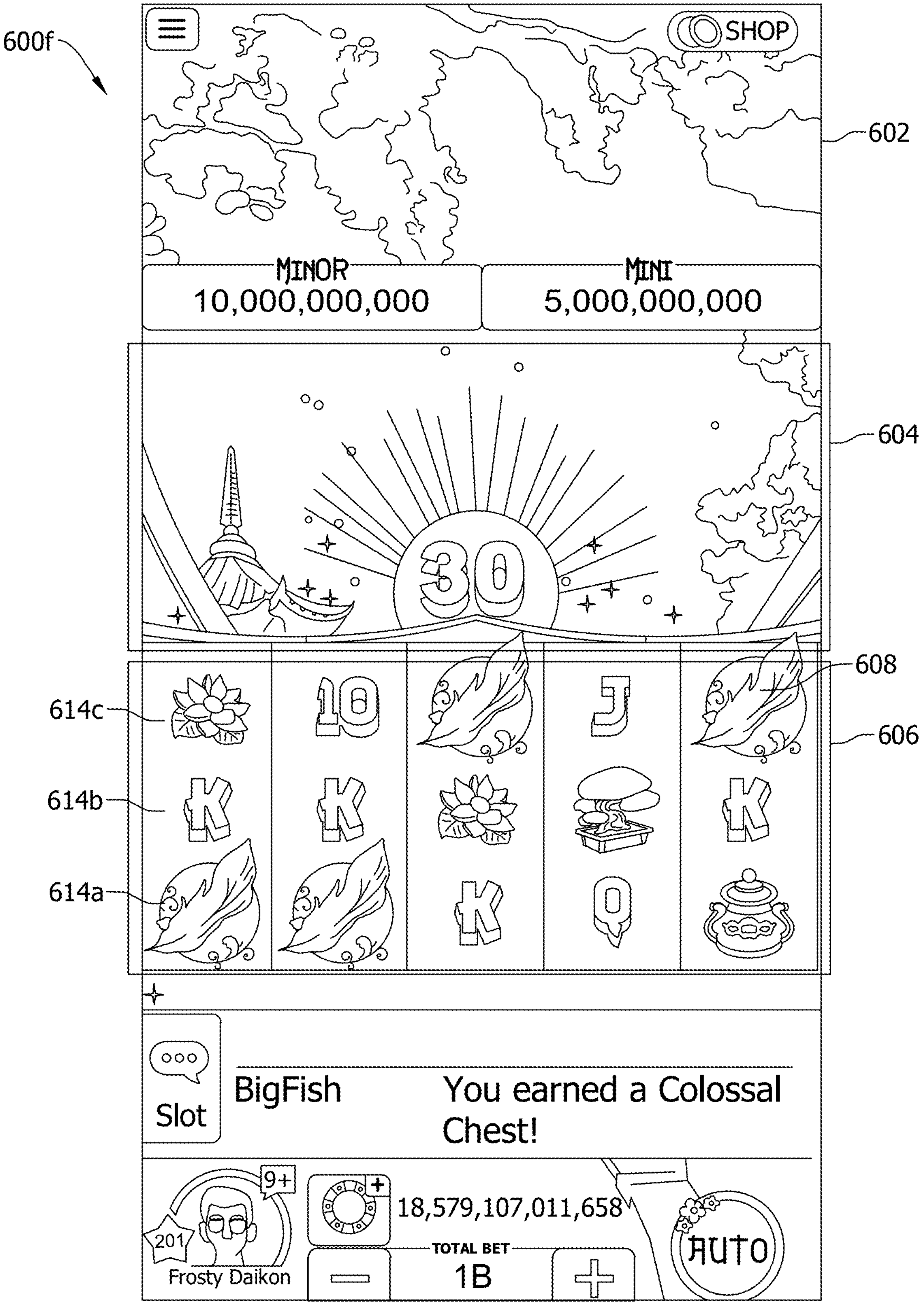
Figure 6G:
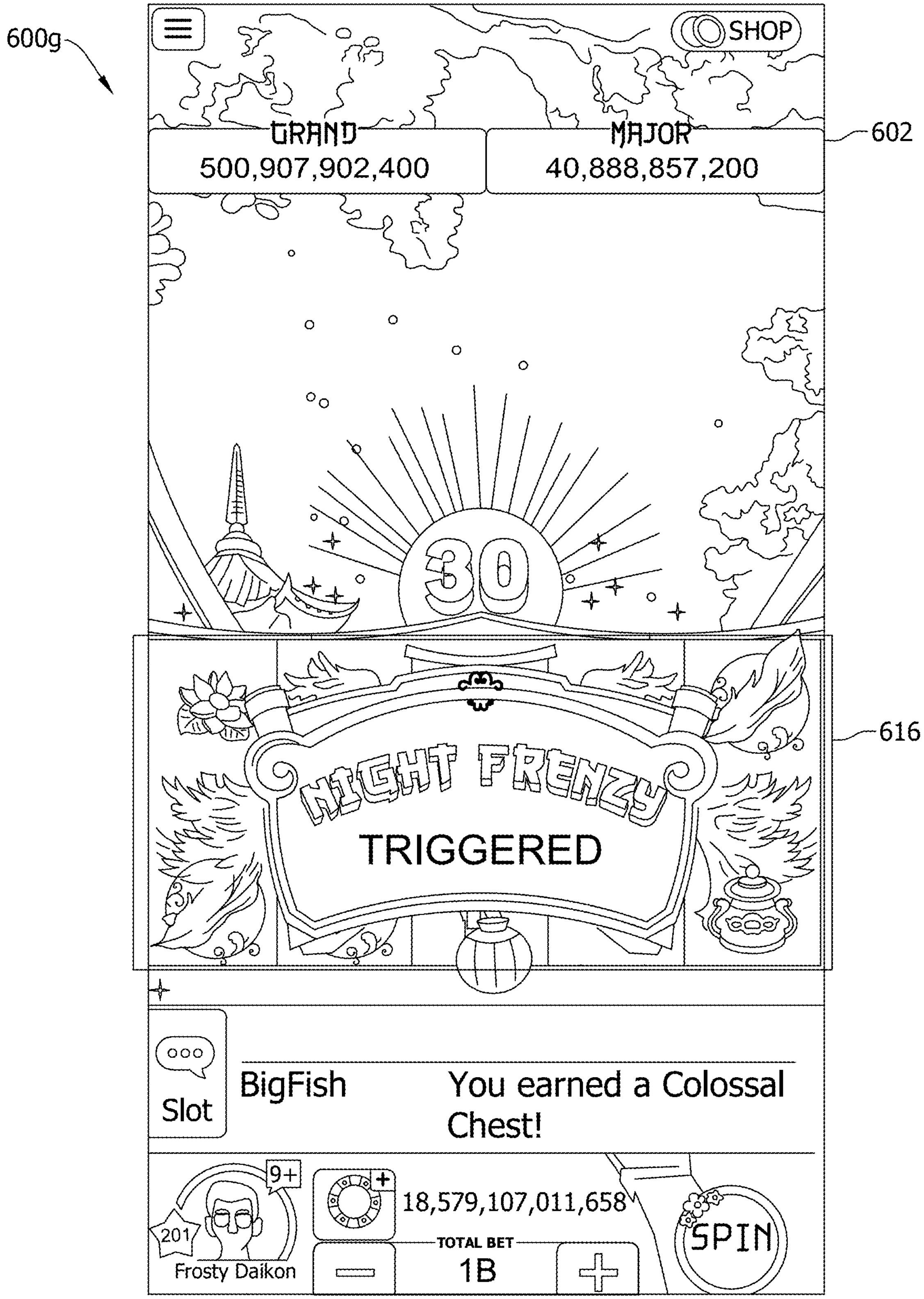
Figure 6H:
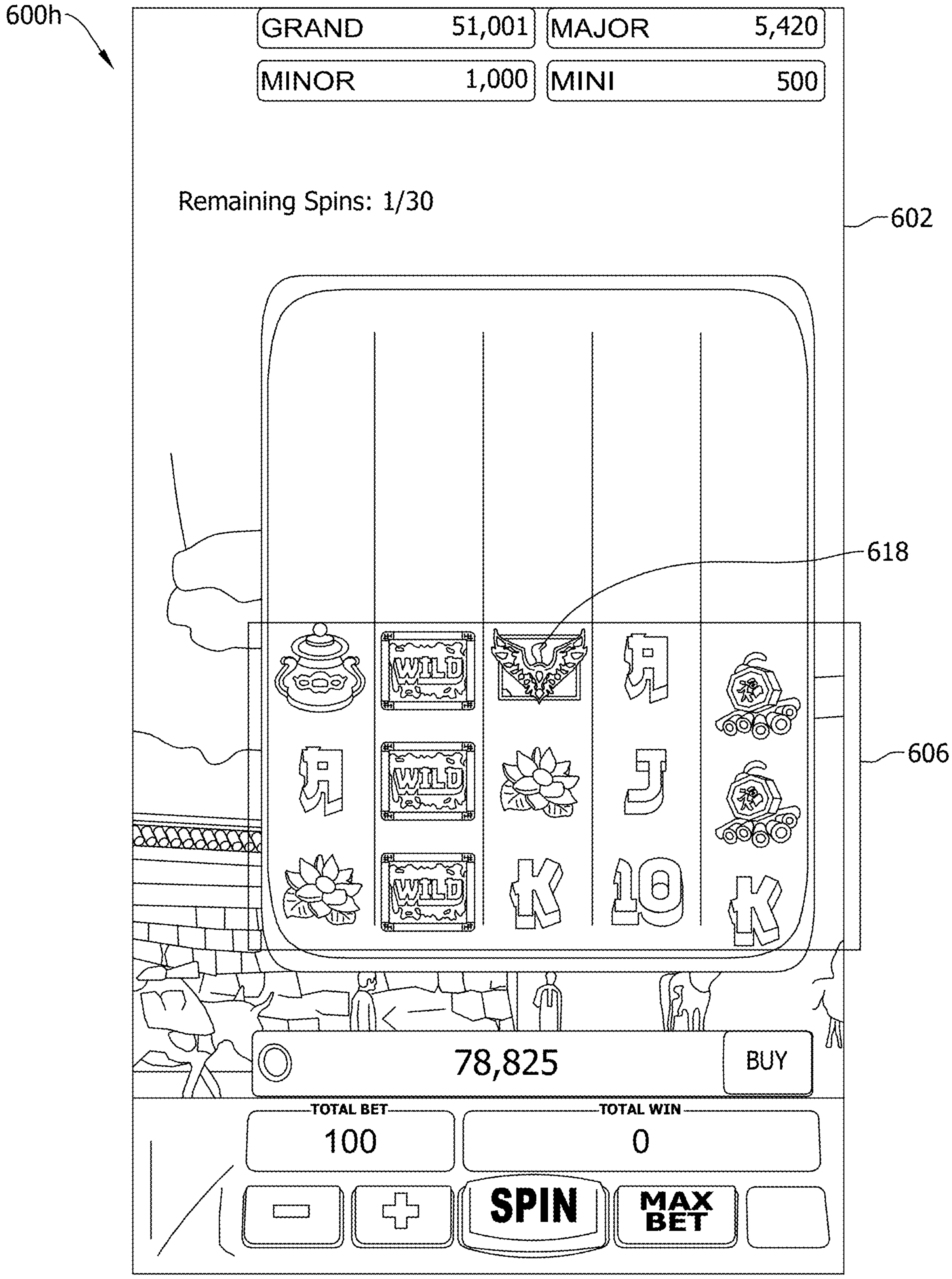

An exemplary screen view 600*f* of FIG. 6F illustrates an animation being displayed in the animation section 604 when the night frenzy mode feature is triggered after the 100 collect symbols 608 have been displayed on the reel matrix 606 or when the night frenzy mode feature is randomly triggered (referred to herein as a random night frenzy feature). Additionally, the reel matrix 606 may be updated to display an overlay notifying the player that the night frenzy mode feature is triggered as shown in an exemplary screen view 600*g* of FIG. 6G.

Figure 6I:
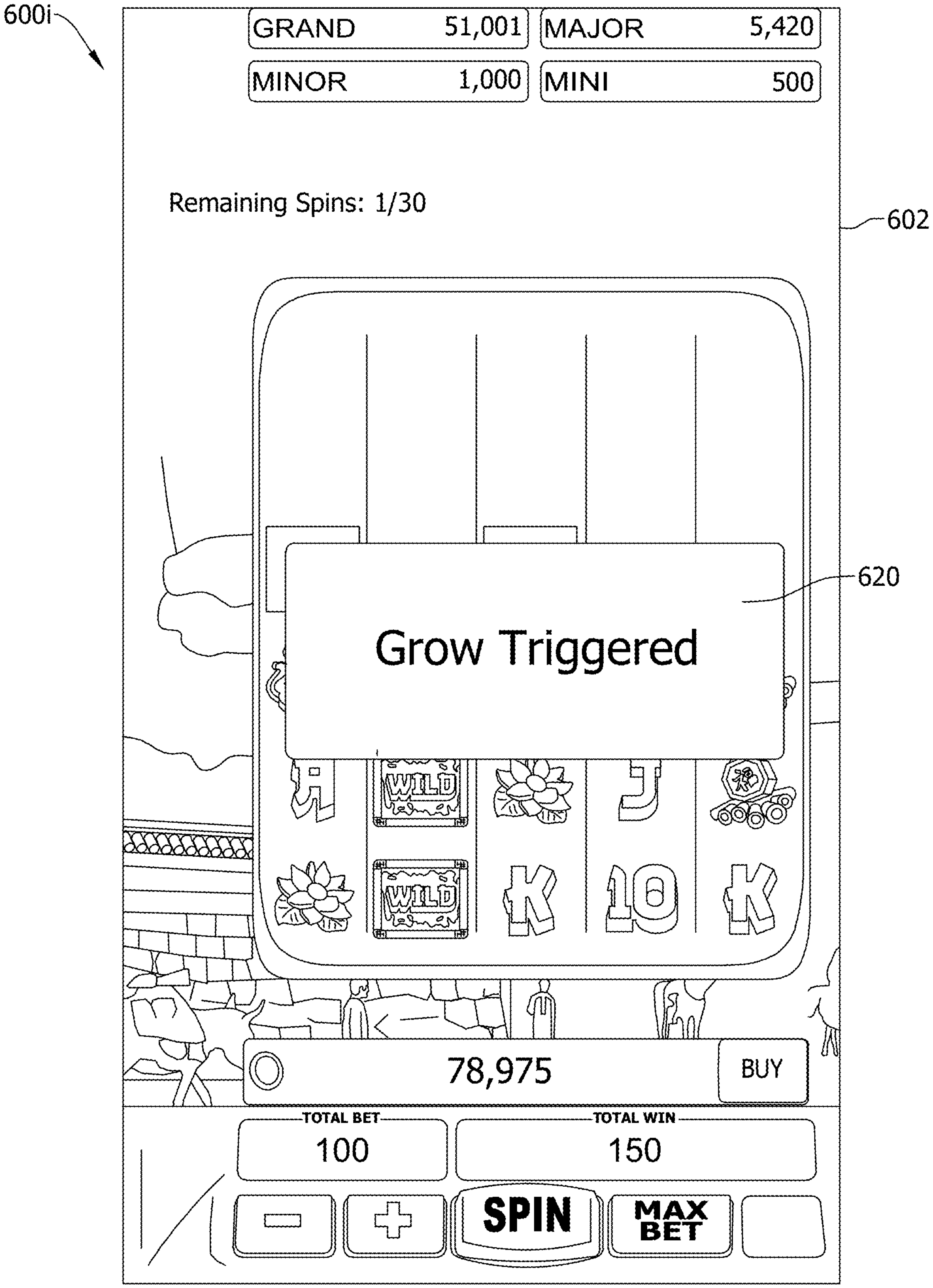

During the night frenzy mode feature, the reel matrix 606 may be expanded and one or more additional rows may be added to each reel. Additionally, the animation section 604 may be eliminated from displaying on the display device of the electronic gaming device 602, as shown in an exemplary screen view 600*h* of FIG. 6H. The player may be awarded a predetermined number of free spins, for example, 30 free spins, during the night frenzy mode feature. The remaining number of free spins (not labeled) available to the player may be displayed on the display device of the electronic gaming device 602. When a Phoenix symbol 618 lands in a position on the reel matrix 606, an overlay 620 shown in exemplary screen view 600*i* in FIG. 6I is displayed. The overlay 620 displays a message notifying the player that an additional row will be added to the reel matrix 606, and accordingly the player may have improved chances of winning awards and improved chances of winning larger awards.

Figure 6J:
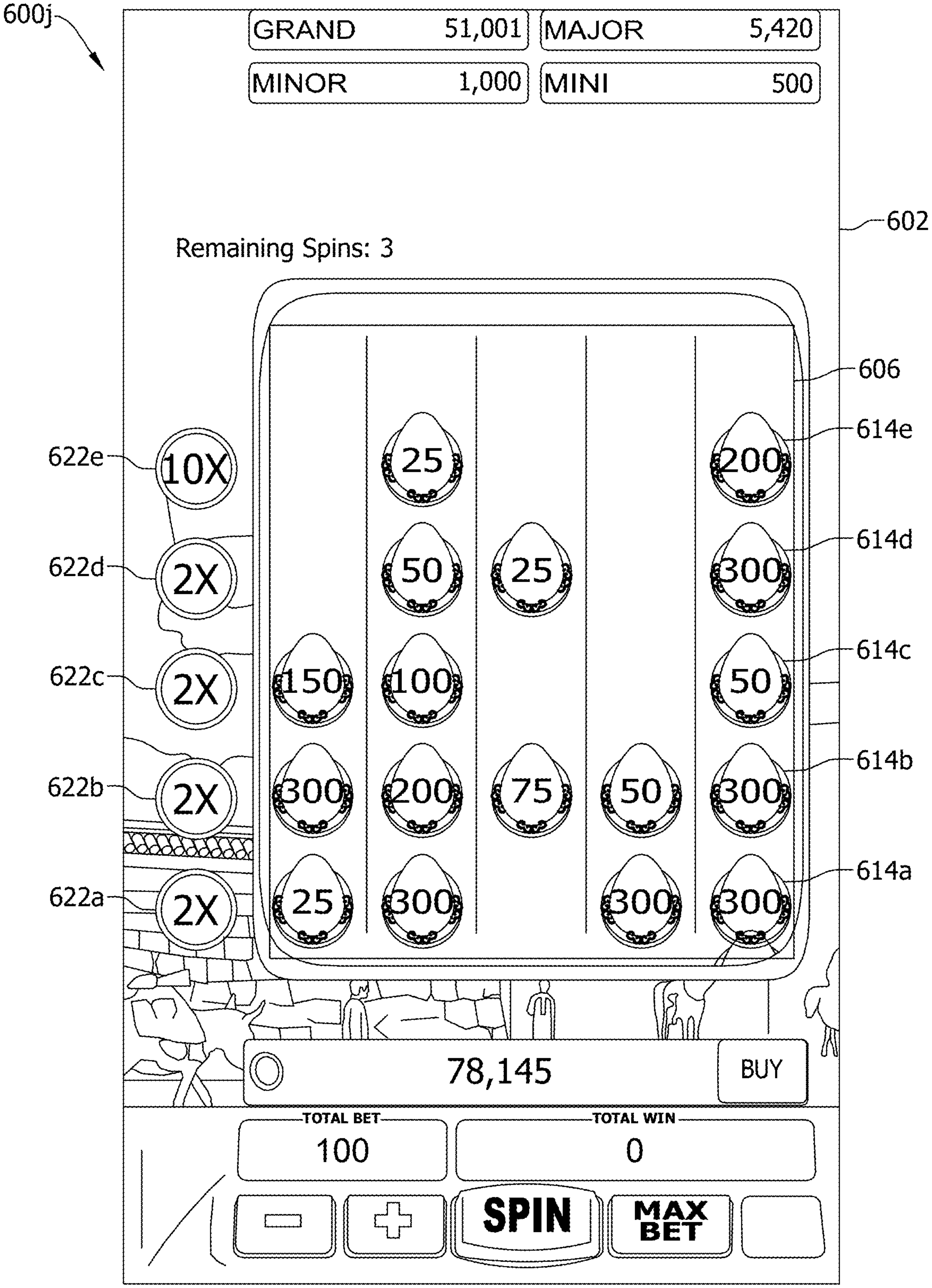

As described herein, during the night frenzy mode feature, the HNS bonus feature and/or the free spin bonus game may also be triggered as described herein when at least a predesignated number (e.g., 6) of COR symbols and/or bonus symbols (e.g., 3) are displayed in symbol positions on the reel matrix 606. An exemplary screen view 600*j* shown in FIG. 6J illustrates the HNS bonus feature triggered during the night frenzy mode feature. As shown in FIG. 6J, the reel matrix 606 includes rows 614*a*-614*c* which were originally present in the reel matrix 606 and two additional rows 614*d*-614*e* which were added during the HNS bonus feature.

By way of a non-limiting example, a total number of additional rows being added to the reel matrix 606 during the HNS bonus feature may be predetermined and may be limited to 3 additional rows. Further, a set of multiplier values 622*a*-622*e* may be selected using an RNG. Each multiplier value of the set of multiplier values 622*a*-622*e* corresponds with a row of rows 614*a*-614*e* as shown in FIG. 6J. As described herein, the player will be awarded an award value for a row in which all symbol positions have COR symbols (including a Mini Jackpot symbol, a Major Jackpot symbol, a Minor Jackpot symbol, a Grand Jackpot symbol) being multiplied by the respective multiplier value. The values shown on the other displayed COR symbols, those not in a fully filled row, may also be awarded, but the multiplier may not be applied. The multiplier only gets applied when the row is full of COR symbols.

Figure 7:
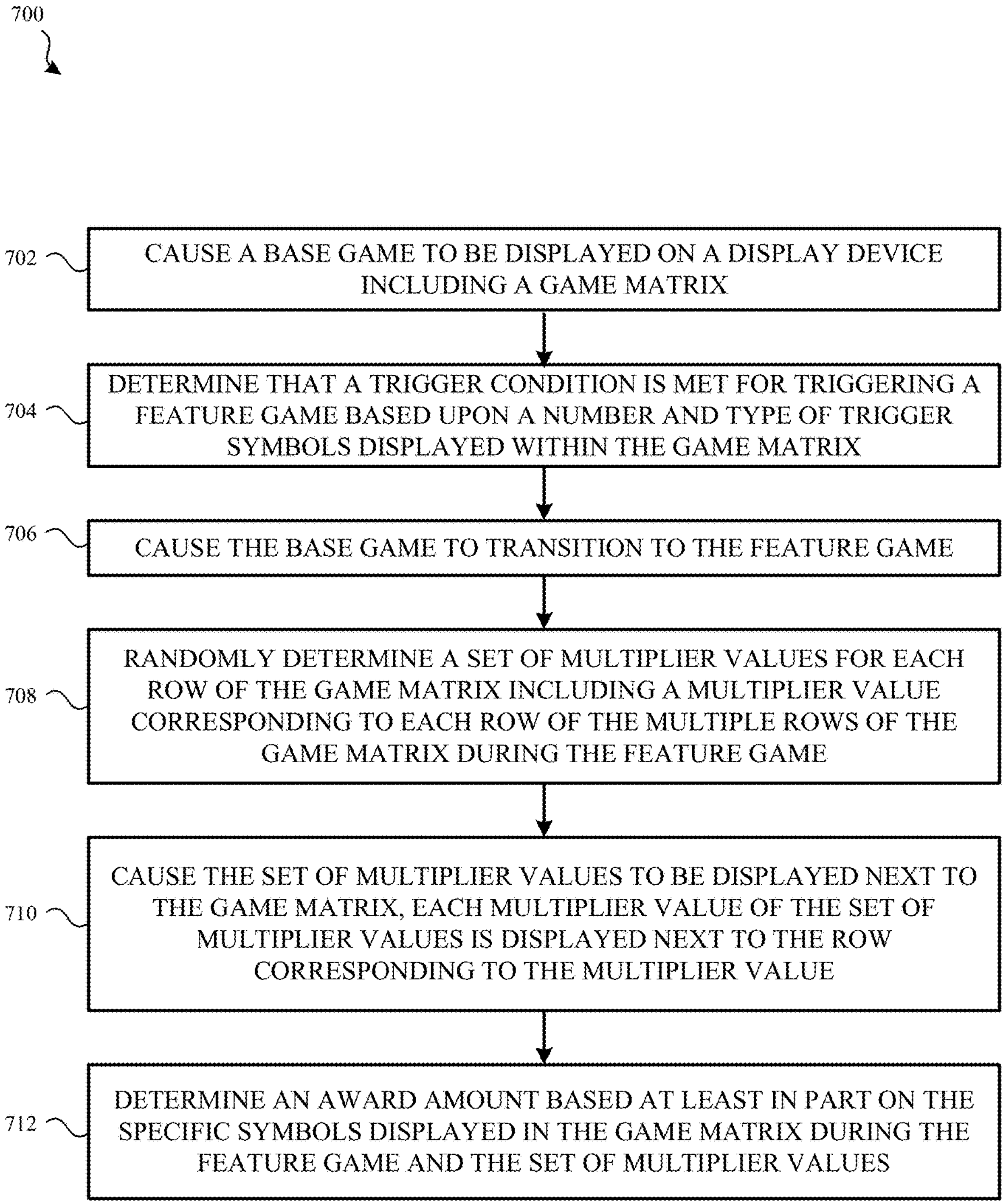
FIG. 7 illustrates an exemplary flow-chart of method operations performed by an electronic gaming device, in accordance with certain embodiments of the present disclosure.

FIG. 7 illustrates an exemplary flow-chart 700 of method operations performed by an electronic gaming device, in accordance with certain embodiments of the present disclosure. The operations include causing 702 a base game to be displayed on a display device including a game matrix. Referring to the game matrix 404 or 504 shown in FIG. 4A or FIG. 5A, the game matrix includes a plurality of symbols positions forming multiple rows (e.g., 408*a*-408*c* or 508*a*-508*c*) and columns (406*a*-406*e* or 506*a*-506*e*). Each symbol position displays a symbol therein. The operations further include determining 704 that a trigger condition is met for triggering a feature game based upon a number and type of trigger symbols displayed within the game matrix of the base game and causing 706 the base game to transition the feature game.

By way of a non-limiting example, the trigger condition may be met when a predesignated number of cash-on-reel symbols, a Mini Jackpot symbol, a Major Jackpot symbol, a Minor Jackpot symbol, or a Grand Jackpot symbol are displayed in symbol positions of the game matrix during the base game, and thus, transitioning to a hold-and-spin bonus feature game by persistently displaying the trigger symbols within the game matrix from the base game into the hold-and-spin bonus feature game. The trigger condition may also be met when a predesignated number of collect symbols are displayed in symbol positions of the game matrix during a plurality of game instances of the base game to transition to a night frenzy mode. Additionally, or alternatively, the trigger condition may be met when a predesignated animated object (e.g., the Phoenix) is displayed in the animation section of the display device while the plurality of symbol positions within the game matrix are spinning. In some embodiments, the trigger condition may be met when a predesignated number of bonus symbols are displayed in symbol positions of the game matrix during the base game, transitioning the base game to a free spin bonus game. A player may be awarded a number of free spin bonus games corresponding to a total number of bonus symbols displayed in the symbol positions of the game matrix during the base game, as described herein. By way of a non-limiting example, the base game may include a day mode base game with an animation that includes the sun moving across a horizon as collect symbols are displayed and collected. The movement of the sun being a metamorphic indicating progress being made towards triggering the night frenzy mode during the day mode base game.

The operations further include randomly determining 708 a set of multiplier values for each row of the game matrix. The set of multiplier values including a multiplier value corresponding to each row of the multiple rows of the game matrix. The operations may include, based upon one or more symbols being displayed in one or more symbol positions of the game matrix, causing 710 the set of multiplier values to be displayed next to the game matrix. Each multiplier value of the set of multiplier values is displayed next to the row corresponding to the multiplier value. The multiplier value for a corresponding row may be applied to the total value of all cash-on-reel symbols included within the row when all symbol positions within the corresponding row are filled with cash-on-reel symbols.

During the night frenzy mode, when a grow trigger symbol (e.g., Phoenix symbol) is displayed, at least one additional row may be added to the game matrix. Wherein when the base game transitions to the feature game, the set of multiplier values randomly selected and displayed corresponds with the increased number of rows included within the game matrix. During the hold-and-spin feature game, additional symbol positions in an additional row may be added when the one or more symbols displayed in the one or more symbol positions of the game matrix include one or more cash-on-reel symbols, a Mini Jackpot symbol, a Major Jackpot symbol, a Minor Jackpot symbol, a wild symbol, and/or a Grand Jackpot symbol displayed in all symbol positions of a row of the multiple rows during the feature game. During the free spin bonus game, an animation may be displayed that indicates that all symbol positions within a column of the game matrix are transitioned to wild symbols. By way of a non-limiting example, the animation may include a Phoenix flying over the column being transitioned to the wild symbols. The operations may further include determining 712 an award amount based at least in part on the symbols displayed in the game matrix during the feature game and the set of multiplier values as described herein.

Accordingly, various embodiments, as described herein, may provide at least an ability to decouple the base game from the HNS bonus feature, the night frenzy, and/or the free spin bonus game to allow for potential expansion of the reel matrix between the base game and any free spin or HNS features during a bonus game, and/or the ability to improve an amount of data storage and use of computational resources based on a randomly selected set of reels and corresponding multiplier values during the bonus game, free game, HNS bonus feature, the free spin bonus game, and/or the night frenzy.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming device comprising:

a memory device for storing instructions; and a game controller comprising at least one processor configured to execute the instructions stored in the memory device, which, when executed by the at least one processor, causes the game controller to:

cause a base game to be displayed on a display device including a game matrix, the game matrix including a plurality of symbol positions forming multiple rows and columns within the game matrix, each symbol position for displaying a symbol therein;

cause at least one additional row to be added to the game matrix when a grow trigger symbol is displayed during a night frenzy mode of the base game;

determine that a trigger condition is met for triggering a feature game based upon a number and type of trigger symbols displayed within the game matrix of the base game;

cause the base game to transition to the feature game;

randomly determine, using an output from a random number generator (RNG) and one or more weighted lookup tables, a set of multiplier values for each row of the game matrix including a multiplier value corresponding to each row of the multiple rows of the game matrix during the feature game, wherein the one or more weighted lookup tables are selected based on the number of rows included within the game matrix;

cause the set of multiplier values to be displayed next to the game matrix, wherein each multiplier value of the set of multiplier values is displayed next to the row corresponding to the multiplier value; and determine an award amount based at least in part on the symbols displayed in the game matrix during the feature game and the set of multiplier values, wherein the multiplier value for a corresponding row is applied to a value of all cash-on-reel symbols included within the row when all symbol positions within the corresponding row are filled with cash-on-reel symbols.

2. The electronic gaming device of claim 1, wherein the trigger condition is met when a predesignated number of cash-on-reel symbols, a Mini Jackpot symbol, a Major Jackpot symbol, a Minor Jackpot symbol, or a Grand Jackpot symbol are displayed in symbol positions of the game matrix during the base game, wherein the feature game includes a hold and spin feature game that persistently displays the trigger symbols within the game matrix from the base game into the feature game.

3. The electronic gaming device of claim 1, wherein the trigger condition is met when a predesignated number of bonus symbols are displayed in the symbol positions of the game matrix during the base game transitioning the base game to a free spin bonus game.

4. The electronic gaming device of claim 3, wherein the instructions, when executed by the at least one processor, further cause the game controller to award a number of free spin bonus games corresponding to a total number of bonus symbols displayed in the symbol positions of the game matrix during the base game.

5. The electronic gaming device of claim 3, wherein during the free spin bonus game, the instructions, when executed by the at least one processor, may further cause the game controller to cause an animation to be displayed that indicates that all symbol positions within a column of the game matrix are transitioned to wild symbols.

6. The electronic gaming device of claim 5, wherein the animation includes a Phoenix flying over the column being transitioned to wild symbols.

7. The electronic gaming device of claim 1, wherein the trigger condition is met when a predesignated number of collect symbols are displayed within the symbol positions of the game matrix during a plurality of game instances of the base game transitioning the base game to the night frenzy mode.

8. The electronic gaming device of claim 7, wherein the base game is a day mode base game, and wherein the instructions, when executed by the at least one processor, further causes the game controller to display an animation including a sun moving across a horizon as collect symbols are collected indicating a progress towards triggering the night frenzy mode.

9. The electronic gaming device of claim 7, wherein when the base game transitions to the feature game, the randomly selected and displayed set of multiplier values corresponds with the increased number of rows included within the game matrix.

10. The electronic gaming device of claim 1, wherein the trigger condition is met when a distinguishable symbol is displayed in an animation section of the display device while the plurality of symbol positions within the game matrix is spinning, and wherein the distinguishable symbol is a Phoenix symbol.

11. A computer-implemented method performed by an electronic gaming device comprising a memory device for storing instructions, and at least one processor configured to execute the instructions stored in the memory device, the method comprising:

causing a base game to be displayed on a display device including a game matrix, the game matrix including a plurality of symbol positions forming multiple rows and columns within the game matrix, each symbol position for displaying a symbol therein;

causing at least one additional row to be added to the game matrix when a grow trigger symbol is displayed during a night frenzy mode of the base game;

determining that a trigger condition is met for triggering a feature game based upon a number and type of trigger symbols displayed within the game matrix of the base game;

causing the base game to transition to the feature game;

randomly determining, using an output from a random number generator (RNG) and one or more weighted lookup tables, a set of multiplier values for each row of the game matrix including a multiplier value corresponding to each row of the multiple rows of the game matrix during the feature game, wherein the one or more weighted lookup tables are selected based on the number of rows included within the game matrix;

causing the set of multiplier values to be displayed next to the game matrix, wherein each multiplier value of the set of multiplier values is displayed next to the row corresponding to the multiplier value; and determining an award amount based at least in part on the symbols displayed in the game matrix during the feature game and the set of multiplier values, wherein the multiplier value for a corresponding row is applied to a value of all cash-on-reel symbols included within the row when all symbol positions within the corresponding row are filled with cash-on-reel symbols.

12. The computer-implemented method of claim 11, wherein the trigger condition is met when a predesignated number of cash-on-reel symbols, a Mini Jackpot symbol, a Major Jackpot symbol, a Minor Jackpot symbol, or a Grand Jackpot symbol are displayed in symbol positions of the game matrix during the base game, wherein the feature game includes a hold and spin feature game that persistently displays the trigger symbols within the game matrix from the base game into the feature game.

13. The computer-implemented method of claim 11, wherein the trigger condition is met when a predesignated number of collect symbols are displayed within the symbol positions of the game matrix during a plurality of game instances of the base game transitioning the base game to the night frenzy mode.

14. The computer-implemented method of claim 13, wherein the base game is a day mode base game, and the method further comprising displaying an animation including a sun moving across a horizon as collect symbols are collected indicating a progress towards triggering the night frenzy mode.

15. The computer-implemented method of claim 13, wherein when the base game transitions to the feature game, the randomly selected and displayed set of multiplier values corresponds with the increased number of rows included within the game matrix.

16. The computer-implemented method of claim 11, wherein the trigger condition is met when a distinguishable symbol is displayed in an animation section of the display device while the plurality of symbol positions within the game matrix is spinning, and wherein the distinguishable symbol is a Phoenix symbol.

17. At least one non-transitory computer-readable media (CRM) storing instructions thereon, which, when executed by at least one processor of an electronic gaming device, cause the at least one processor to:

cause a base game to be displayed on a display device including a game matrix, the game matrix including a plurality of symbol positions forming multiple rows and columns within the game matrix, each symbol position for displaying a symbol therein;

cause at least one additional row to be added to the game matrix when a grow trigger symbol is displayed during a night frenzy mode of the base game;

determine that a trigger condition is met for triggering a feature game based upon a number and type of trigger symbols displayed within the game matrix of the base game;

cause the base game to transition to the feature game;

randomly determine, using an output from a random number generator (RNG) and one or more weighted lookup tables, a set of multiplier values for each row of the game matrix including a multiplier value corresponding to each row of the multiple rows of the game matrix during the feature game, wherein the one or more weighted lookup tables are selected based on the number of rows included within the game matrix;

cause the set of multiplier values to be displayed next to the game matrix, wherein each multiplier value of the set of multiplier values is displayed next to the row corresponding to the multiplier value; and determine an award amount based at least in part on the symbols displayed in the game matrix during the feature game and the set of multiplier values, wherein the multiplier value for a corresponding row is applied to a value of all cash-on-reel symbols included within the row when all symbol positions within the corresponding row are filled with cash-on-reel symbols.

18. The at least one non-transitory CRM of claim 17, wherein the trigger condition is met when a predesignated number of cash-on-reel symbols, a Mini Jackpot symbol, a Major Jackpot symbol, a Minor Jackpot symbol, or a Grand Jackpot symbol are displayed in symbol positions of the game matrix during the base game, wherein the feature game includes a hold and spin feature game that persistently displays the trigger symbols within the game matrix from the base game into the feature game.

19. The at least one non-transitory CRM of claim 17, wherein the trigger condition is met when a predesignated number of collect symbols are displayed within the symbol positions of the game matrix during a plurality of game instances of the base game transitioning the base game to the night frenzy mode.

20. The at least one non-transitory CRM of claim 19, wherein the base game is a day mode base game, and wherein the instructions, when executed by the at least one processor, further causes the at least one processor to display an animation including a sun moving across a horizon as collect symbols are collected indicating a progress towards triggering the night frenzy mode.

* * * * *